(12) United States Patent
Takahashi et al.

(10) Patent No.: US 11,830,195 B2
(45) Date of Patent: Nov. 28, 2023

(54) TRAINING LABEL IMAGE CORRECTION METHOD, TRAINED MODEL CREATION METHOD, AND IMAGE ANALYSIS DEVICE

(71) Applicant: Shimadzu Corporation, Kyoto (JP)

(72) Inventors: Wataru Takahashi, Kyoto (JP); Ayako Akazawa, Kyoto (JP); Shota Oshikawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 374 days.

(21) Appl. No.: 17/265,760

(22) PCT Filed: Aug. 6, 2018

(86) PCT No.: PCT/JP2018/029473
§ 371 (c)(1),
(2) Date: Feb. 3, 2021

(87) PCT Pub. No.: WO2020/031243
PCT Pub. Date: Feb. 13, 2020

(65) Prior Publication Data
US 2021/0272288 A1    Sep. 2, 2021

(51) Int. Cl.
*G06T 7/11* (2017.01)
*G06F 18/214* (2023.01)
(Continued)

(52) U.S. Cl.
CPC .............. *G06T 7/11* (2017.01); *G06F 18/214* (2023.01); *G06N 20/00* (2019.01); *G06T 7/0012* (2013.01);
(Continued)

(58) Field of Classification Search
CPC ...... G06F 18/214; G06N 20/00; G06N 20/10; G06N 20/20; G06N 3/045; G06N 3/08; G06T 2207/20081; G06T 7/0012; G06T 7/11; G06V 10/421; G06V 10/774; G06V 10/82; G06V 20/695; G06V 20/698; G06V 2201/033
See application file for complete search history.

(56) References Cited

U.S. PATENT DOCUMENTS 5,594,809 A  *  1/1997  Kopec ................... G06F 18/295
                                                           382/161
9,552,536 B2 *  1/2017  Ando .................... G06F 18/217
(Continued)

FOREIGN PATENT DOCUMENTS

JP        2014-22837 A       2/2014
JP        2019101535 A  *    6/2019

OTHER PUBLICATIONS

Written Opinion by the International Search Authority for PCT application No. PCT/JP2018/029473, dated Sep. 25, 2018, submitted with a machine translation.

*Primary Examiner* — Tsung Yin Tsai
(74) *Attorney, Agent, or Firm* — Muir Patent Law, PLLC

(57) ABSTRACT

A training label image correction method includes performing a segmentation process on an input image (11) of training data (10) by a trained model (1) using the training data to create a determination label image (14), comparing labels of corresponding portions in the determination label image (14) and a training label image (12) with each other, and correcting label areas (13) included in the training label image based on label comparison results.

15 Claims, 14 Drawing Sheets

(51) Int. Cl.
*G06N 20/00* (2019.01)
*G06T 7/00* (2017.01)
*G06V 10/42* (2022.01)
*G06V 10/774* (2022.01)
*G06V 10/82* (2022.01)
*G06V 20/69* (2022.01)

(52) U.S. Cl.
CPC .......... *G06V 10/421* (2022.01); *G06V 10/774* (2022.01); *G06V 10/82* (2022.01); *G06T 2207/20081* (2013.01); *G06V 20/695* (2022.01); *G06V 20/698* (2022.01)

(56) References Cited

U.S. PATENT DOCUMENTS

| | | | | |
|---|---|---|---|---|
| 9,558,423 | B2* | 1/2017 | Perry | G06V 10/774 |
| 9,767,386 | B2* | 9/2017 | Lin | G06V 10/776 |
| 2011/0099133 | A1* | 4/2011 | Chang | G06N 20/00 |
| | | | | 706/12 |
| 2016/0026900 | A1* | 1/2016 | Ando | G06V 10/776 |
| | | | | 382/159 |
| 2016/0379091 | A1* | 12/2016 | Lin | G06V 10/776 |
| | | | | 382/156 |
| 2019/0030371 | A1* | 1/2019 | Han | A61N 5/1039 |

\* cited by examiner (FIRST EMBODIMENT) TRAINING LABEL IMAGE CORRECTION METHOD

FIG.6
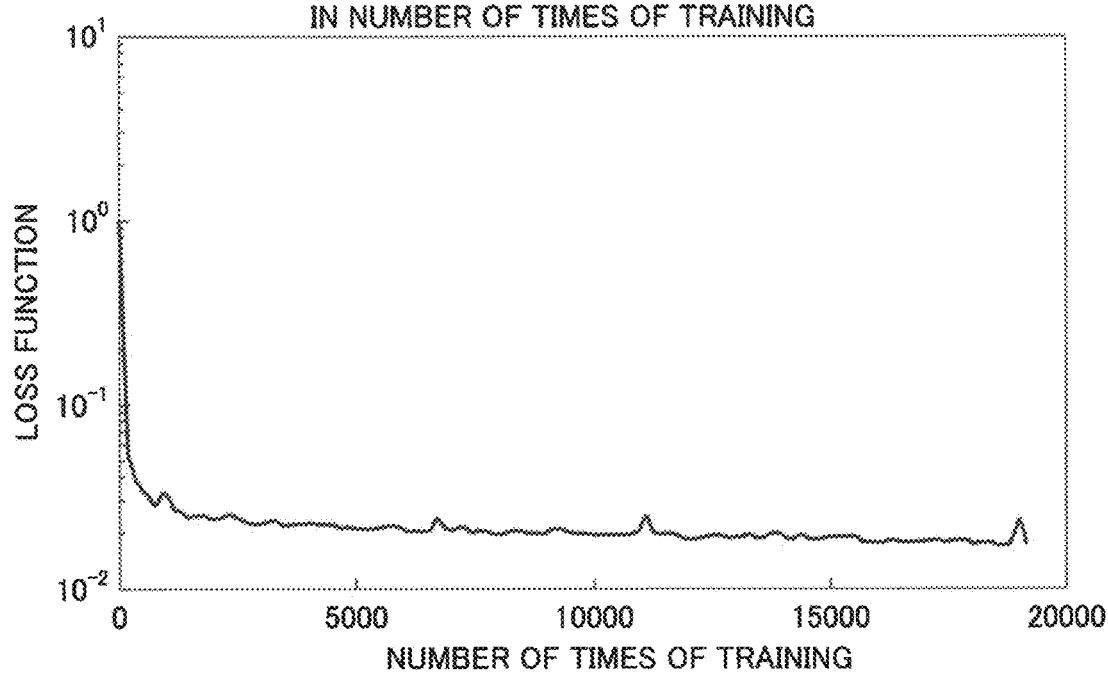
FIG.7
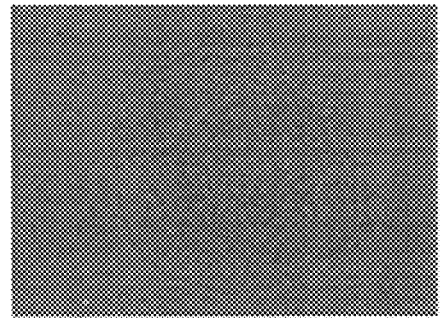
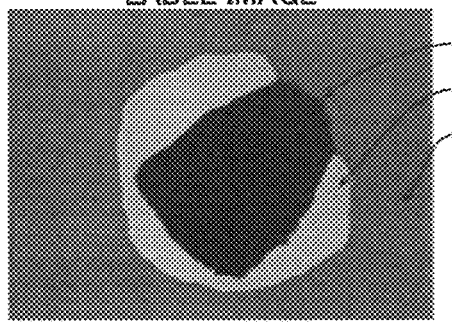
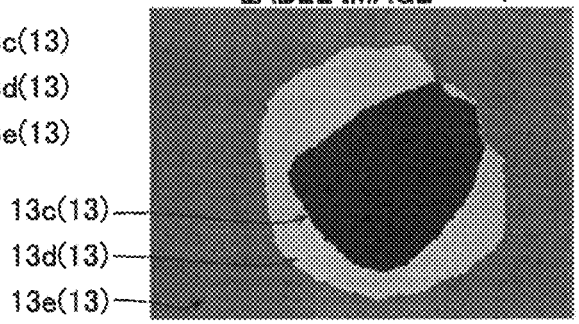

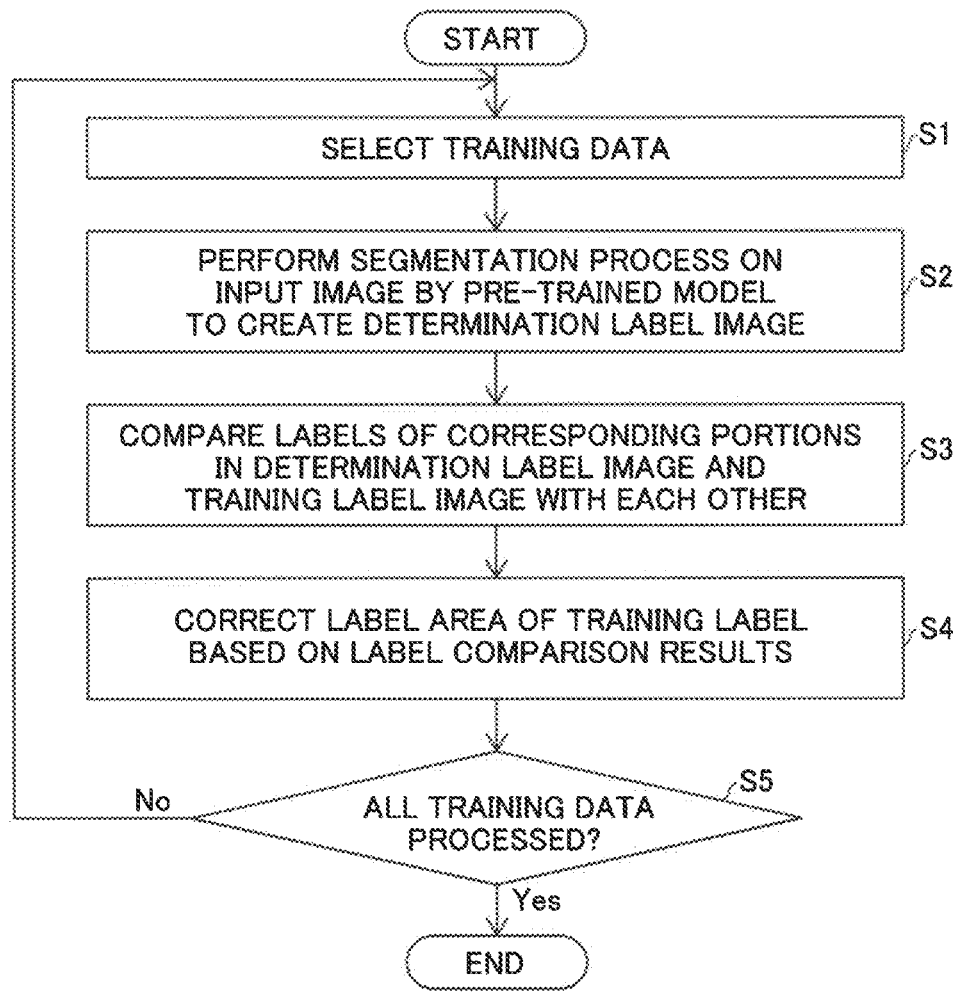

(SECOND EMBODIMENT)

(SECOND EMBODIMENT)

(MODIFIED EXAMPLE)

(MODIFIED EXAMPLE)

(MODIFIED EXAMPLE)

TRAINING LABEL IMAGE CORRECTION METHOD, TRAINED MODEL CREATION METHOD, AND IMAGE ANALYSIS DEVICE

TECHNICAL FIELD

The present invention relates to a training label image correction method, a trained model creation method, and an image analysis device.

BACKGROUND ART

Conventionally, training label image correction in machine learning is known. Such training label image correction is disclosed in Japanese Patent Laid-Open No. 2014-022837, for example.

Japanese Patent Laid-Open No. 2014-022837 discloses that a classifier (trained model) to perform image classification that assigns a label indicating whether a detection target appears (a positive example) or does not appear (a negative example) in a certain video section in video data such as a TV program is constructed by machine learning. Training data including video and a label of whether it is a positive example or a negative example is used to construct the classifier. The label of the training data may contain errors and/or omissions. Therefore, Japanese Patent Laid-Open No. 2014-022837 discloses that the label of the initial training data or the label of the training data in which the label has been set is corrected based on an user input or the result of detection of the training data by another classifier.

PRIOR ART

Patent Document

Patent Document 1: Japanese Patent Laid-Open No. 2014-022837

SUMMARY OF THE INVENTION

Problems to be Solved by the Invention

The classifier disclosed in Japanese Patent Laid-Open No. 2014-022837 simply classifies the input video and labels the input video in units of video, but as a technique different from such image segmentation, there is image segmentation. The image segmentation is a technique for dividing an image into a plurality of areas instead of the entire image, and divides an input image into a plurality of label areas by assigning a label indicating a detection target to an area in which the detection target appears. Note that the "image segmentation" in this specification is called semantic segmentation because a meaning is given to an area by a label, unlike simple area division (boundary detection) that does not assign a label such as edge detection.

In machine learning (supervised learning) for constructing a trained model used for image segmentation, an input image and a training label image in which the input image has been divided into areas for each label are used. The training label image in this case is created by extracting the label areas from an original image by a threshold process, for example. There is a variation in the appearance (such as the signal strength) of the detection target in each input image, and thus creation of the training label image is shared by a large number of label creators, and each label creator manually adjusts a threshold to create the training label image.

Consequently, the creation of the training label image includes an individual difference in threshold setting, for example, and a certain label area may be extracted to a large or small extent. Furthermore, there is a case in which the boundaries of the label areas are ambiguous in the first place depending on an image, and in that case, the boundaries of the label areas tend to vary. Therefore, the boundaries in the training label image are corrected.

However, unlike the simple label correction for each image as disclosed in Japanese Patent Laid-Open No. 2014-022837, in order to correct the variations in the boundaries of the label areas in the training label image, it is desirable to correct the label areas with consistent criteria for all training label images. Therefore, for example, it takes a lot of effort such as making corrections only by a specific operator. It is also possible to create a dedicated trained model for correcting a training label image, but this requires learning a highly accurate training label image created with consistent criteria, and thus similarly, it takes a lot of effort. Therefore, it is desired that correction of the training label image used for machine learning of the image segmentation process can be easily performed while ensuring the accuracy.

The present invention is intended to solve at least one of the above problems. The present invention aims to provide a training label image correction method, a trained model creation method, and an image analysis device capable of easily performing correction of a training label image used for machine learning of an image segmentation process while ensuring the accuracy.

Means for Solving the Problems

In order to attain the aforementioned object, as a result of earnest studies, the inventors have found that even in the case of training label images including variations in the boundaries of label areas, a trained model that has undergone sufficient machine learning using those training label images produces intermediate segmentation results obtained by statistically averaging variations in the boundaries of many training label images, and thus the segmentation results by the trained model can be consistent criteria for the variations in the boundaries in the training label image. Based on this finding, the training label image correction method according to a first aspect of the present invention is a training label image correction method in machine learning for performing a segmentation process on an image, and includes performing the segmentation process on an input image of training data including the input image and a training label image by a trained model using the training data to create a determination label image divided into a plurality of label areas, comparing labels of corresponding portions in the created determination label image and the training label image with each other, and correcting the label areas included in the training label image based on label comparison results.

In the training label image correction method according to the first aspect of the present invention, with the configuration described above, the training label image can be corrected based on a comparison between the determination label image created by the trained model trained using the training data including the training label image containing variations in the boundaries of the label areas and the training label image. That is, under ordinary circumstances, machine learning is performed on the premise that the label areas of the training label image are correct, and the trained model is created. However, in the segmentation results (determination label image) using the trained model that has undergone sufficient training, intermediate results of variations in the boundaries of many training label images are obtained with respect to the boundary portions of the label areas, and thus the validity of the boundaries in the determination label image can be considered to be higher than that in the individual training label image including the variations. Therefore, the label areas of the training label image are corrected based on the comparison results between the determination label image and the training label image with reference to the determination label image such that the variations in the boundaries can be reduced based on consistent criteria (the boundaries of the label areas of the determination label image) by automatic correction using a computer instead of a label correction operator. Accordingly, correction of the training label image used for machine learning of the image segmentation process can be simplified while ensuring the accuracy.

In the aforementioned training label image correction method according to the first aspect, the correcting the label areas may include correcting ranges of the label areas in the training label image so as to be closer to the label areas of the determination label image based on the label comparison results. Accordingly, the ranges of the label areas in the training label image are simply matched with the label areas of the determination label image or are simply set to intermediate ranges between the label areas of the training label image and the label areas of the determination label image, for example, such that a correction can be easily and effectively made to reduce the variations in the label areas of the individual training label image.

In this case, the correcting the label areas may include correcting the label areas by at least one of expansion or contraction of the label areas in the training label image. Accordingly, the label areas of the training label image can be corrected by a simple process of expanding or contracting the ranges of the label areas in the training label image based on the label comparison results. The expansion of the label areas indicates increasing the areas of the label areas, and the contraction of the label areas indicates reducing the areas of the label areas.

In the aforementioned training label image correction method according to the first aspect, the comparing the labels may include acquiring a matching portion and a non-matching portion with the training label image in the determination label image for a label of interest by comparing the determination label image with the training label image, and the correcting the label areas may include correcting a range of a label area with the label of interest based on the matching portion and the non-matching portion. Accordingly, it is possible to understand, from the matching portions and the non-matching portions between the determination label image and the training label image, how the label area of the training label image deviates from the determination label image that serves as a reference for variations in the boundaries of many training label images. Therefore, the label area can be easily corrected based on the matching portion and the non-matching portion such that a variation in the boundary is reduced.

In this case, the comparing the labels may include acquiring a non-detection evaluation value for evaluating undetected labels in the determination label image and a false-detection evaluation value for evaluating falsely detected labels in the determination label image based on the matching portion and the non-matching portion, and the correcting the label areas may include correcting the label areas of the training label image based on a comparison between the non-detection evaluation value and the false-detection evaluation value. Non-detection indicates that a portion with a label of interest in the training label image has not been detected as the corresponding label area in the determination label image, and when there are many undetected areas, it is estimated that the label areas of the training label image are larger than the label areas of the determination label image. False detection indicates that a different label has been assigned to a portion in the training label image corresponding to a portion detected as a label area of interest in the determination label image, and when there are many falsely detected areas, it is estimated that the label areas of the training label image are smaller than the label areas of the determination label image. Therefore, the non-detection evaluation value and the false-detection evaluation value are compared such that it is possible to understand how the label areas of the training label image should be corrected (whether it should be increased or decreased), and thus the label areas of the individual training label image can be more appropriately corrected.

In the aforementioned configuration including acquiring the non-detection evaluation value and the false-detection evaluation value, the correcting the label areas may include expanding the label areas of the training label image when it is determined by the comparison between the non-detection evaluation value and the false-detection evaluation value that there are more falsely detected labels than undetected labels in the determination label image. Accordingly, when there are many falsely detected areas and it is estimated that the label areas of the training label image are smaller than the label areas of the reference determination label image, the label areas of the training label image are expanded such that a correction can be easily made to reduce the variations in the boundaries of the label areas.

In the aforementioned configuration including acquiring the non-detection evaluation value and the false-detection evaluation value, the correcting the label areas may include contracting the label areas of the training label image when it is determined by the comparison between the non-detection evaluation value and the false-detection evaluation value that there are more undetected labels than falsely detected labels in the determination label image. Accordingly, when there are many undetected areas and it is estimated that the label areas of the training label image are larger than the label areas of the reference determination label image, the label areas of the training label image are contracted such that a correction can be easily made to reduce the variations in the boundaries of the label areas.

The aforementioned configuration including acquiring the non-detection evaluation value and the false-detection evaluation value may further include excluding the training data including the training label image determined to have at least one of more than a predetermined threshold number of undetected labels or more than a predetermined threshold number of falsely detected labels from training data set. Accordingly, when at least one of the number of undetected labels or the number of falsely detected labels is excessively large in the comparison with the reference determination label image, the training label image is considered to be inappropriate as the training data. Therefore, the training label image in which at least one of the number of undetected labels or the number of falsely detected labels is large is excluded from the training data set such that the training data corresponding to a so-called statistical outlier that is a factor that lowers the accuracy of machine learning can be excluded. Thus, the quality of the training data set can be improved, and highly accurate machine learning can be performed.

The aforementioned training label image correction method according to the first aspect may further include setting priorities between labels of the training label image, and the correcting the label areas may include adjusting amounts of correction of the label areas according to the priorities. The segmentation process is to distinguish and label an area in an image in which a detection target appears, and thus different priorities can be set for the labels according to the purpose of the process in order to distinguish between the detection target (priority: high) and a non-detection target (priority: low), for example. Therefore, with the configuration described above, the amount of correction of a label with a higher priority can be intentionally biased such that detection omissions can be significantly reduced or prevented as much as possible, for example. Consequently, the training label image can be appropriately corrected according to the purpose of the segmentation process.

In this case, the correcting the label areas may include correcting the label areas of the training label image while expansion of the label areas having a lower priority to the label areas having a higher priority is prohibited. Accordingly, even when the label areas having a lower priority are corrected by expansion, the label areas having a higher priority can be preserved. Therefore, it is possible to obtain the training label image (training data) capable of being learned, in which detection omissions of the label areas with a higher priority are significantly reduced or prevented while the variations in the boundaries are significantly reduced or prevented.

In the aforementioned training label image correction method according to the first aspect, the correcting the label areas may include dividing the training label image into a plurality of partial images, and correcting the label areas for at least one partial image of the divided training label image. Accordingly, only a specific portion of the training label image can be corrected, or each small portion can be corrected individually.

In the aforementioned training label image correction method according to the first aspect, the comparing the labels may include comparing the labels of the corresponding portions of the determination label image and the training label image with each other for every image pixel or every plurality of adjacent image pixels. Accordingly, the determination label image and the training label image can be compared with each other for each small area of a unit of one pixel or a unit of multiple pixels, and thus the variations in the label areas of the training label image can be evaluated more accurately.

In the aforementioned training label image correction method according to the first aspect may further include creating the determination label image by the trained model using the training data including the corrected training label image, and the correcting the label areas may include correcting the label areas included in the corrected training label image again based on comparison results between the created determination label image and the corrected training label image. Accordingly, machine learning is performed using the corrected training label image, and then the determination label image is created again such that the label areas of the training label image can be repeatedly corrected. The label areas are repeatedly corrected such that the variations in the label areas of the training label image can be further reduced.

A trained model creation method according to a second aspect of the present invention is a trained model creation method by machine learning for performing a segmentation process on an image, and includes acquiring a pre-trained model by the machine learning using training data including an input image and a training label image, performing the segmentation process on the input image of the training data by the acquired pre-trained model to create a determination label image divided into a plurality of label areas, comparing labels of corresponding portions in the created determination label image and the training label image with each other, correcting the label areas included in the training label image based on label comparison results, and creating a trained model by performing the machine learning using the training data including the corrected training label image. The creating the trained model can include both (1) creating the trained model by performing the machine learning (additional training) on the pre-trained model using the training data including the corrected training label image and (2) creating the trained model by performing the machine learning on an untrained training model using the training data including the corrected training label image.

In the trained model creation method according to the second aspect of the present invention, similarly to the first aspect, the label areas of the training label image are corrected based on the comparison results between the determination label image and the training label image with reference to the determination label image such that the variations in the boundaries can be reduced based on consistent criteria (the boundaries of the label areas of the determination label image) even by automatic correction using a computer. Accordingly, correction of the training label image used for machine learning of the image segmentation process can be simplified while ensuring the accuracy. Furthermore, the machine learning is performed on the pre-trained model using the training data including the corrected training label image such that the trained model with significantly reduced determination variations in the boundary portions of the label areas, which is capable of a high-quality segmentation process, can be obtained.

An image analysis device according to a third aspect of the present invention includes an image input configured to receive an input of an analysis image, an analysis processor configured to perform a segmentation process on the analysis image using a trained model by machine learning to create a label image divided into a plurality of label areas, a storage configured to store the trained model, a determination image creating unit configured to perform the segmentation process on an input image of training data including the input image and a training label image with the trained model stored in the storage as a pre-trained model to create a determination label image, a comparator configured to compare labels of corresponding portions in the determination label image created by the determination image creating unit and the training label image with each other, and a label corrector configured to correct the label areas included in the training label image based on label comparison results by the comparator.

In the image analysis device according to the third aspect of the present invention, similarly to the first aspect, the label areas of the training label image are corrected based on the comparison results between the determination label image and the training label image with reference to the determination label image created by the pre-trained model such that the variations in the boundaries can be reduced based on consistent criteria (the boundaries of the label areas of the determination label image) even by automatic correction using a computer. Accordingly, correction of the training label image used for machine learning of the image segmentation process can be simplified while ensuring the accuracy.

Effect of the Invention

According to the present invention, as described above, it is possible to easily perform the correction of the training label image used for machine learning of the image segmentation process while ensuring the accuracy.

BRIEF DESCRIPTION OF THE DRAWINGS

FIG. 6 is a graph for illustrating a change in the loss function with an increase in the number of times of learning.

FIG. 7 is a diagram showing examples of an input image, a determination image, and the training label image.

FIG. 10 is a flowchart for illustrating a method for correcting the label areas of the training label image.

FIG. 11 is a diagram for illustrating a method for comparing the training label image with the determination image.

MODES FOR CARRYING OUT THE INVENTION

Embodiments embodying the present invention are hereinafter described on the basis of the drawings.

A training label image correction method, a trained model creation method, and an image analysis device according to a first embodiment are now described with reference to FIGS. 1 to 13.

Figure 1:
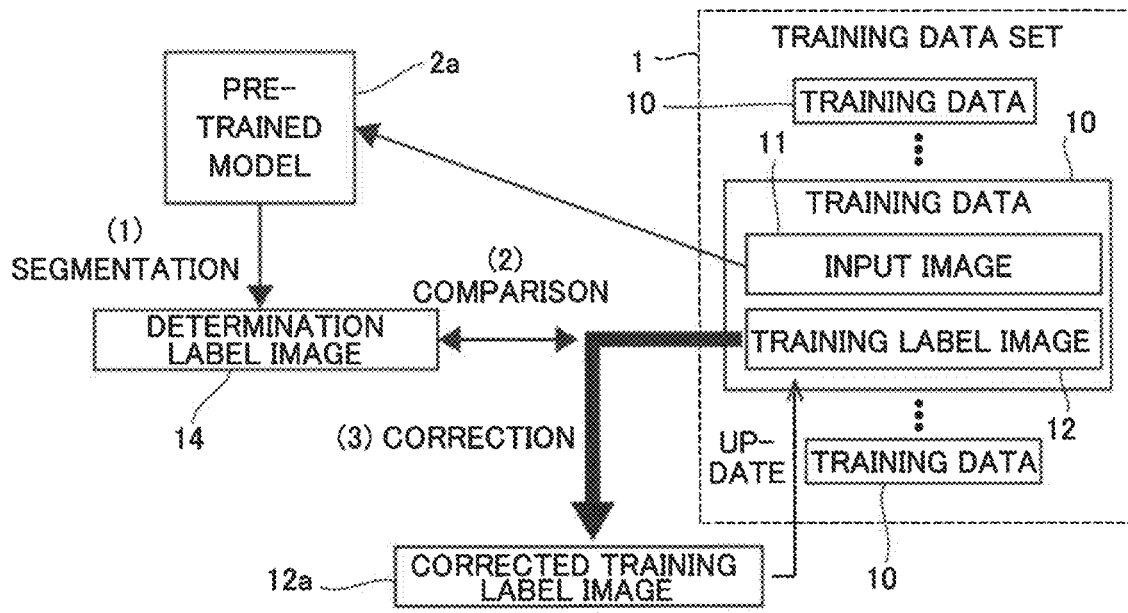
FIG. 1 is a diagram for illustrating a training label image correction method according to a first embodiment.

The training label image correction method according to the first embodiment shown in FIG. 1 is a method for correcting a training label image in machine learning for performing an image segmentation process. Hereinafter, performing the segmentation process may be paraphrased as "performing area division".

Figure 2:
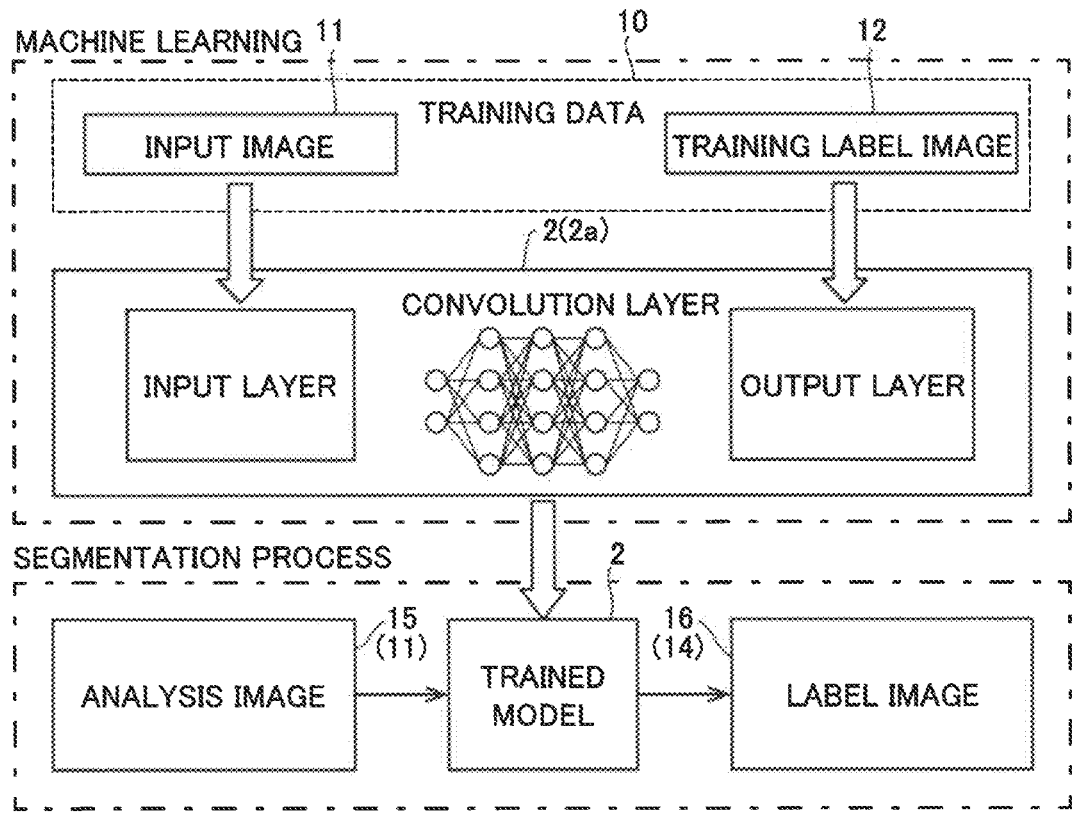
FIG. 2 is a diagram showing the overview of machine learning and a segmentation process.
Figure 3:
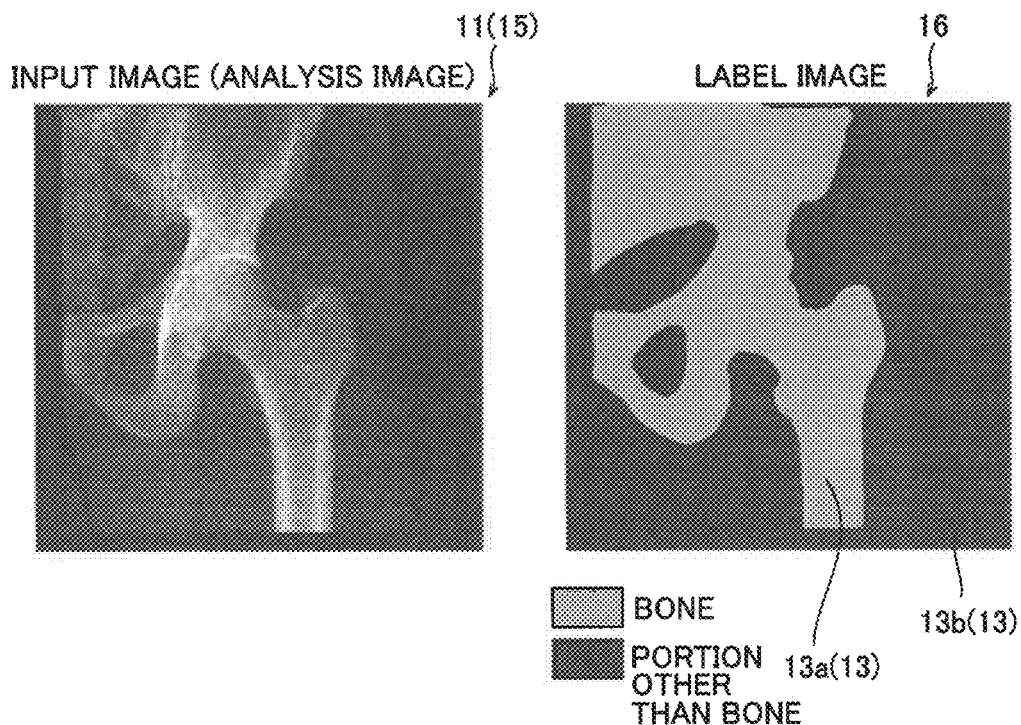
FIG. 3 is a diagram showing examples of an X-ray image of a bone and a label image of two classes.

As shown in FIG. 2, the image segmentation process is performed by a trained model 2 created by machine learning. The trained model 2 performs the segmentation process on an input image (an analysis image 15 or an input image 11) and outputs a label image (a label image 16 or a determination label image 14) divided into a plurality of label areas 13 (see FIGS. 3 and 4). As a machine learning method, any method such as a fully convolutional network (FCN), a neural network, a support vector machine (SVM), or boosting can be used. For the trained model 2 in the first embodiment, from the viewpoint of the identification performance of the label areas, it is preferable to use a convolutional network frequently used for semantic segmentation, and it is more preferable to use a fully convolutional network. Such a trained model 2 includes an input layer into which an image is input, a convolution layer, and an output layer.

In order to create a trained model that performs the image segmentation process, machine learning is performed using a training data set 1 (see FIG. 1) that includes a large number of training data 10.

The training data 10 used for machine learning includes at least the input image 11 and a training label image 12. The input image 11 is an original image before performing the segmentation process. The training label image 12 is created as a correct image to be generated as a result of the segmentation process on the input image 11. That is, the training label image 12 is a label image obtained by dividing the input image 11 into a plurality of label areas 13. Each of the label areas 13 is an area (a portion of an image) including a group of pixels with a common label in an image.

The label is information indicating a meaning indicated by an image portion including the label area 13. Segmentation is performed by assigning a label to each pixel in an image. The label may be assigned in units of a group (pixel group) of a plurality of pixels. The type of label is called a class.

The number of classes (the types of labels) is not particularly limited as long as there are a plurality of (two or more) classes. In the simplest example, the classes include two classes, a "detection target" label and a "non-detection target" label. For example, in FIG. 3, an example is shown in which using an X-ray image of the human pelvis (a base of the femur) as the input image 11, area division into a label area 13a of a "bone" as a detection target and a label area 13b of a "portion other than the bone" has been performed.

Figure 4:
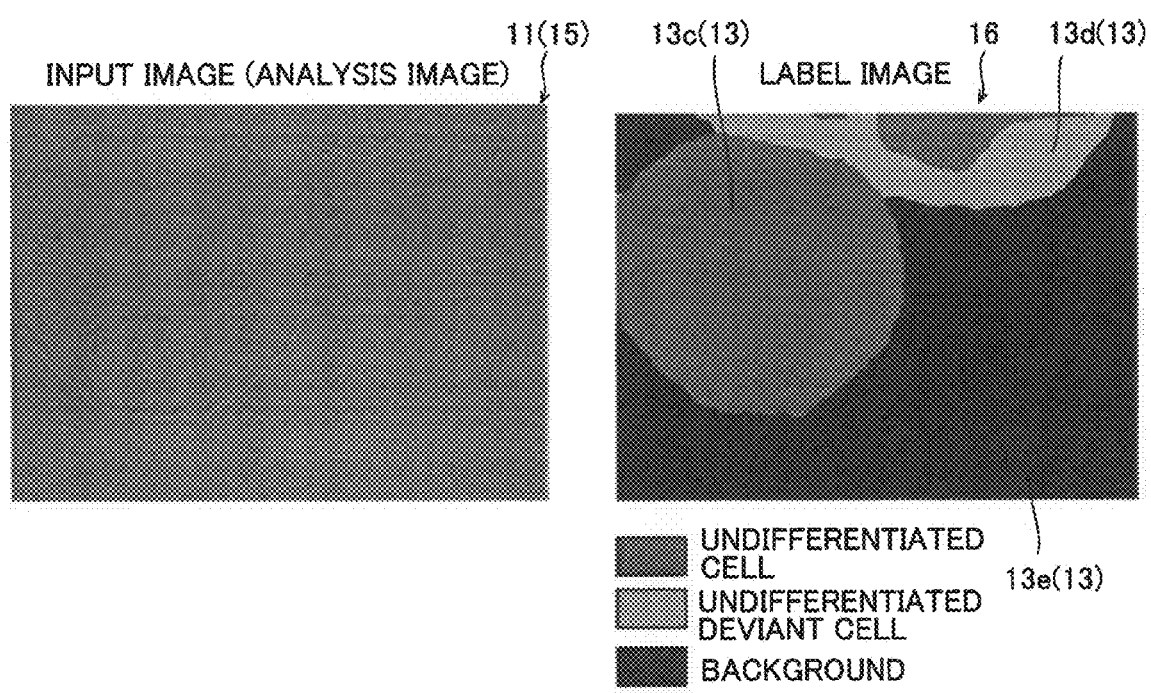
FIG. 4 is a diagram showing examples of a cell image and a label image of three classes.

FIG. 4 shows an example in which using an image (cell image) of a pluripotent stem cell, such as an iPS cell or an ES cell, as the input image 11, area division into three classes is performed. In FIG. 4, area division into three classes including a label area 13c of an "undifferentiated cell", which is a cell that maintains pluripotency, a label area 13d of an "undifferentiated deviant cell", which is a cell that has deviated from the undifferentiated state (a cell that has started differentiation or is likely to differentiate), and a label area 13e of a "background" other than those has been performed.

When the trained model is created, the input image 11 is input to a training model, the training label image 12 is output, and a conversion process (segmentation process) from the input image 11 to the training label image 12, which is a correct answer, is learned by the training model. The trained model 2 capable of the segmentation process is generated by performing machine learning. Consequently, the analysis image 15 to be analyzed is input into the trained model 2 such that the segmentation process for the analysis image 15 is performed using the trained model 2 by machine learning, and the label image divided into the plurality of label areas 13 is output.

<Training Label Image>

Figure 5:
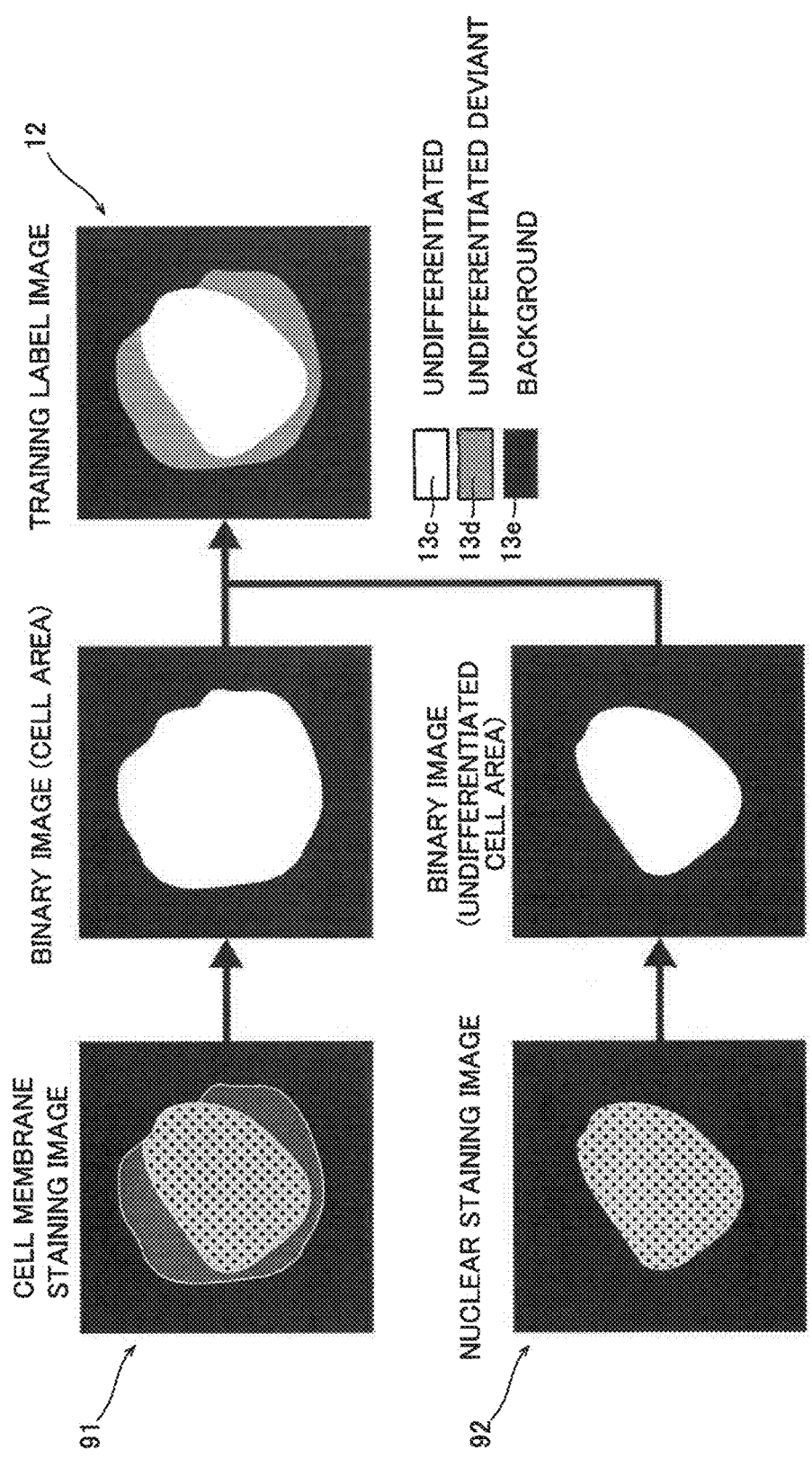
FIG. 5 is a diagram for illustrating a training label image.

FIG. 5 shows an example of creating the training label image 12 in which area division into three classes has been performed with respect to the input image 11 of the pluripotent stem cell shown in FIG. 4. In the example of FIG. 5, for a pluripotent stem cell, a cell membrane staining image 91 in which a cell area has been stained with a staining agent and a nuclear staining image 92 in which a nuclear staining area of an undifferentiated cell has been stained with an undifferentiated marker are acquired, and after the cell membrane staining image 91 and the nuclear staining image 92 are binarized by a threshold process, a difference between the two images is acquired such that the training label image 12 is created.

In such a training label image 12, the training label image 12 is created based on a staining image of a cell, and thus there is an inevitable variation in the degree of staining. Therefore, it is necessary to manually adjust a threshold according to the degree of staining, and depending on setting of the threshold, a boundary portion of the cell becomes relatively large or small with respect to another training label image 12 and varies. In addition, whereas in the cell membrane staining image 91, a cytoskeleton as well as a nucleus is stained, in the nuclear staining image 92, only a nucleus is stained, and thus a stained area may differ slightly between an undifferentiated deviant cell and an undifferentiated cell. Such a difference may cause variations in the boundaries (sizes) of the label areas 13 in the training label image 12. In the X-ray image of the bone shown in FIG. 3, there is no difference in a stained area due to a difference in a staining method, but variations in the boundary portions due to the threshold process occur similarly to the example of the cell image.

When the boundaries of the label areas 13 in an individual training label image 12 vary, the criteria of which portions in an image are defined as boundaries varies. Therefore, in the trained model 2 that has been trained using the training data set 1 including the training label image 12 in which the boundaries of the label areas 13 have varied, the boundaries of the label areas 13 may be blurred or may have an unnatural shape in the generated label image 16 (see FIG. 2).

Therefore, in the first embodiment, as shown in FIG. 1, the trained model 2 (hereinafter referred to as a pre-trained model 2a) trained using the training data 10 including the training label image 12 in which the boundaries of the label areas 13 have varied is used to correct the label areas 13 of the training label image 12.

(Method for Correcting Training Label Image)

Specifically, the method for correcting the training label image in the first embodiment includes the following steps as shown in FIG. 1:
(1) a step of performing the segmentation process on the input image 11 of the training data 10 including the input image 11 and the training label image 12 by the trained model 2 using the training data 10 to create the determination label image 14 divided into a plurality of label areas 13,
(2) a step of comparing the labels of the corresponding portions in the created determination label image 14 and the training label image 12 with each other, and
(3) a step of correcting the label areas 13 included in the training label image 12 based on the label comparison results.

In the first embodiment, the pre-trained model 2a that generates the determination label image 14 is a trained model trained using the training data 10 including the training label image 12 in which the boundaries of the label areas 13 vary.

<Trained Model and Pre-Trained Model>

As the trained model 2 (pre-trained model 2a) that generates the determination label image 14, a trained model that has been trained using the training data set 1 including the training data 10 having a sufficient score and in which the training has appropriately converged is used. That is, in the pre-trained model 2a, machine learning itself is appropriately performed, and the segmentation process can be performed with sufficient accuracy except for the boundaries of the label areas 13. In the field of machine learning, the accuracy of the pre-trained model 2a can be evaluated by obtaining an error (loss function) between the segmentation result (here, the determination label image 14) for each input image 11 and the training label image 12 of the input image 11. As shown in FIG. 6, when training is appropriately performed with the training data set 1 having a sufficient score, in the trained model, a value of the loss function decreases with the number of times of training, and converges at a value corresponding to a limit caused by various inevitable factors including the variations in the boundaries of the label areas 13. In a graph of FIG. 6, the vertical axis represents the loss function logarithmically, and the horizontal axis represents the number of training iterations.

The training label image 12 is a training label image created according to consistent criteria to the extent that training of the pre-trained model 2a can appropriately converge. That is, a large number of training label images 12 included in the training data set 1 have variations in the boundaries of the label areas 13 due to a factor such as the above threshold process, but statistical bias is small enough to allow training to appropriately converge. As can be seen from the images of the pelvis shown in FIG. 3 and the cell images shown in FIG. 4, a ratio of the boundary portions to the entire label areas 13 is very small, and the variations in the boundaries do not interfere with training convergence.

<Details of Method for Correcting Training Label Image>

In the step of creating the determination label image 14, the input image 11 is input to the pre-trained model 2a, and the segmentation process is performed such that the determination label image 14 is created as an output. As shown in FIG. 7, the determination label image 14 is an image obtained by dividing the input image 11 into a plurality of label areas 13, similarly to the training label image 12.

In the step of comparing the labels of the determination label image 14 and the training label image 12, the labels of the corresponding portions in the determination label image 14 and the training label image 12 are compared with each other. The corresponding portions refer to portions that can be regarded as images of the same portions in the determination label image 14 and the training label image 12, and indicate the same coordinates as long as the imaging field of view of each image is the same.

The label comparison between the corresponding portions of the determination label image 14 and the training label image 12 can be performed for every image pixel or for every plurality of adjacent image pixels. The plurality of adjacent pixels include a certain pixel and surrounding pixels, and may be a square area of 4 (2×2) pixels or 9 (3×3) pixels, for example. In the first embodiment, preferably, the labels of the corresponding portions of the determination label image 14 and the training label image 12 are compared with each other for each pixel.

In the first embodiment, in the step of comparing the labels, a matching portion and a non-matching portion of the determination label image 14 with the training label image 12 are acquired for a label of interest by comparing the determination label image 14 with the training label image 12.

In the step of correcting the label areas 13 included in the training label image 12, a range of the label area 13 with the label of interest is corrected based on the matching portion and the non-matching portion as the comparison results. The label areas 13 included in the training label image 12 are corrected by replacing the labels assigned to the label areas 13 to be corrected with other labels, for example. As shown in FIG. 1, the label areas 13 are corrected such that a corrected training label image 12a is created. The created corrected training label image 12a is replaced with the original (uncorrected) training label image 12 in the training data 10 (that is, the training label image 12 is updated).

Figure 8:
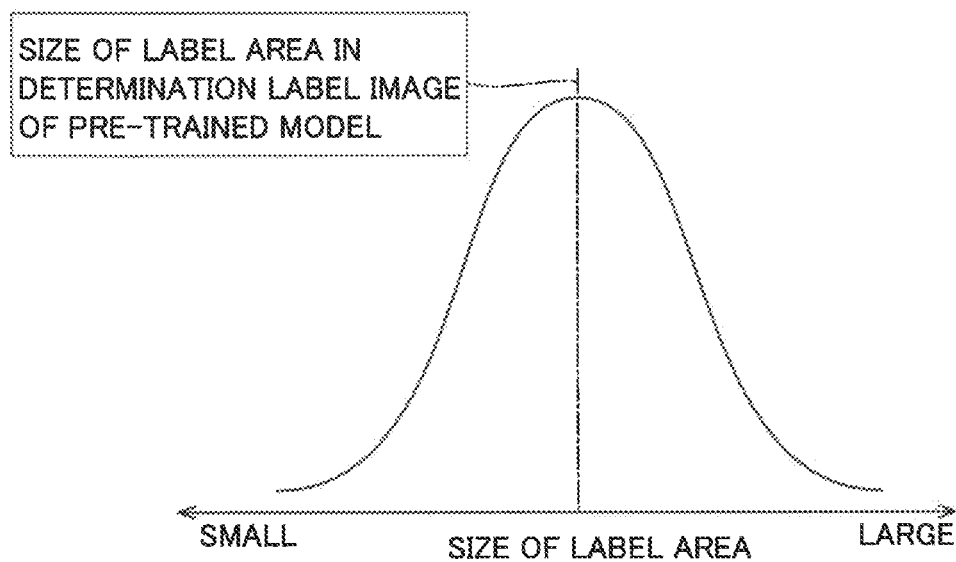
FIG. 8 is a diagram for illustrating a variation in the boundary of a label area of the training label image.

When the training data set 1 allows the training of the pre-trained model 2a to appropriately converge, it is expected that the training label image 12 in which the boundaries of the label areas 13 vary in a direction in which the label areas 13 become relatively large and the training label image 12 in which the boundaries of the label areas 13 vary in a direction in which the label areas 13 become relatively small are distributed substantially evenly (exhibit substantially normal distribution), as shown in FIG. 8. The horizontal axis of FIG. 8 represents the magnitude of the variation, and the vertical axis represents the number (frequency) of training label images having the corresponding variation. As a result of learning the training label image 12 in which the variations are distributed as shown in FIG. 8, the boundaries of the label areas 13 of the determination label image 14 output by the pre-trained model 2a are expected to be consistently intermediate results in the distribution of FIG. 8. Therefore, it can be considered that the boundary portions of the label areas 13 of the individual training label image 12 vary by differences from the determination label image 14 based on the label areas 13 of the determination label image 14 generated by the pre-trained model 2a.

Figure 9:
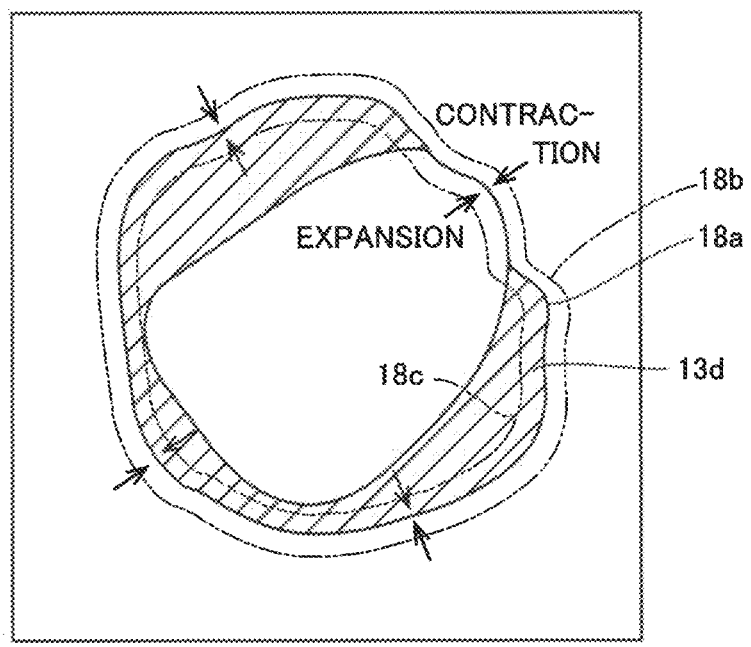
FIG. 9 is a diagram for illustrating correction of label areas of the training label image.

Therefore, in the first embodiment, in the step of correcting the label areas 13, the ranges of the label areas 13 in the training label image 12 are brought closer to the label areas 13 of the determination label image 14 as shown in FIG. 9 based on the comparison results of the labels. Specifically, the correction of the label areas 13 is performed by at least one of expansion or contraction of the label areas 13 in the training label image 12. That is, for the training label image 12 in which the label area 13 is set relatively large (see a boundary 18b) with respect to a boundary 18a of the label area 13 of the determination label image 14, a correction is made to contract the label area 13. For the training label image 12 in which the label area 13 is set relatively small (see a boundary 18c) with respect to the boundary 18a of the label area 13 of the determination label image 14, a correction is made to contract the label area 13. Consequently, it is possible to reduce the variations in the boundary portions of the label areas 13 of the individual training label image 12 without the entire training data set 1 being biased.

The label areas 13 can be corrected by a morphology process, for example. The morphology process determines pixel values of corresponding pixels in the output image (here, the corrected training label image 12a) based on a comparison between pixels of the input image (here, the training label image 12) and pixels adjacent thereto. When an expansion process is performed, the same labels as the label areas 13 are assigned to pixels at the boundaries of the label areas 13 detected by the comparison with the adjacent pixels. When a contract process is performed, the label is removed from the pixels at the boundary of the label area 13 detected by the comparison with the adjacent pixels, and the same label as the label outside the boundary is assigned. The amount of correction by the morphology process (how many pixels to expand or contract the boundary) is not particularly limited, and a correction can be made for one pixel or a plurality of pixels.

<Specific Example of Correcting Training Label Image>

A specific example of correcting the training label image is now shown. As shown in FIG. 10, in step S1, the training data 10 including the training label image 12 to be corrected is selected from the training data set 1.

Step S2 is the above step of creating the determination label image 14. In step S2, the determination label image 14 is created from the input image 11 by the pre-trained model 2a.

Step S3 is the above step of comparing the labels of the determination label image 14 and the training label image 12. As a method for comparing the training label image 12 with the determination label image 14, a confusion matrix 21 of two-class (positive and negative) classification shown in FIG. 11 is illustrated. The vertical direction of the matrix shows the result of the segmentation in the training label image 12, and the horizontal direction of the matrix shows the result of the segmentation in the determination label image 14. TP represents the total number of matching pixels between the determination label image 14 and the training label image 12 to which a "positive" label has been assigned. TN represents the total number of matching pixels between the determination label image 14 and the training label image 12 to which a "negative" label has been assigned. Therefore, TP and TN each represent the number of pixels in the matching portion. On the other hand, FP represents the total number of pixels to which a "positive" label has been assigned in the determination label image 14 and a "negative" label has been assigned in the training label image 12. FN represents the total number of pixels to which a "negative" label has been assigned in the determination label image 14 and a "positive" label has been assigned in the training label image 12. Therefore, FP and FN each represent the number of pixels in the non-matching portion.

In the first embodiment, an evaluation value for evaluating the degree of deviation between the determination label image 14 and the training label image 12 is calculated. Specifically, in the step of comparing the labels, a non-detection evaluation value 22 for evaluating undetected labels and a false-detection evaluation value 23 for evaluating falsely detected labels in the determination label image 14 are acquired based on the matching portion and the non-matching portion. In the first embodiment, the label areas 13 of the training label image 12 are corrected (assuming that it is incorrect), but the non-detection evaluation value 22 and the false-detection evaluation value 23 are evaluation values for evaluating the undetected and falsely detected labels in the determination label image 14 assuming that each label area 13 of the training label image 12 is correct. Assuming that each label area 13 of the training label image 12 is correct, the non-matching portion with the training label image 12 in the determination label image 14 is a portion that is undetected or falsely detected. Therefore, the non-detection evaluation value 22 and the false-detection evaluation value 23 are values for numerically evaluating matching and non-matching with the training label image 12 in the determination label image 14.

The non-detection evaluation value 22 and the false-detection evaluation value 23 are not particularly limited as long as the same are numerical values indicating many (or few) undetected labels and many (or few) falsely detected labels, respectively.

As an example, the non-detection evaluation value 22 is a detection rate (recall or true positive rate; TPR) expressed by the following formula (1). The detection rate is also called sensitivity.

$$K=TP/(TP+FN) \quad (1)$$

The detection rate refers to a "ratio of items (pixels) that can be classified as positive correctly to items (pixels) that should be classified as positive", and indicates few undetected labels. That is, when the detection rate is used as the non-detection evaluation value 22, the larger value indicates fewer undetected labels.

The false-detection evaluation value 23 is a precision expressed by the following formula (2).

$$G=TP/(TP+FP) \quad (2)$$

The precision refers to a "ratio of items that are actually positive among the items classified as positive", and indicates a small number of falsely detected labels. That is, when the precision is used as the false-detection evaluation value 23, the larger value indicates fewer falsely detected labels.

It is possible to determine whether the label areas 13 of the training label image 12 are set relatively large or the label areas 13 are set relatively small by a comparison of the non-detection evaluation value 22 and the false-detection evaluation value 23. Therefore, in the step of correcting the label areas 13, the label areas 13 of the training label image 12 are corrected based on the comparison of the non-detection evaluation value 22 and the false-detection evaluation value 23.

Figure 12:
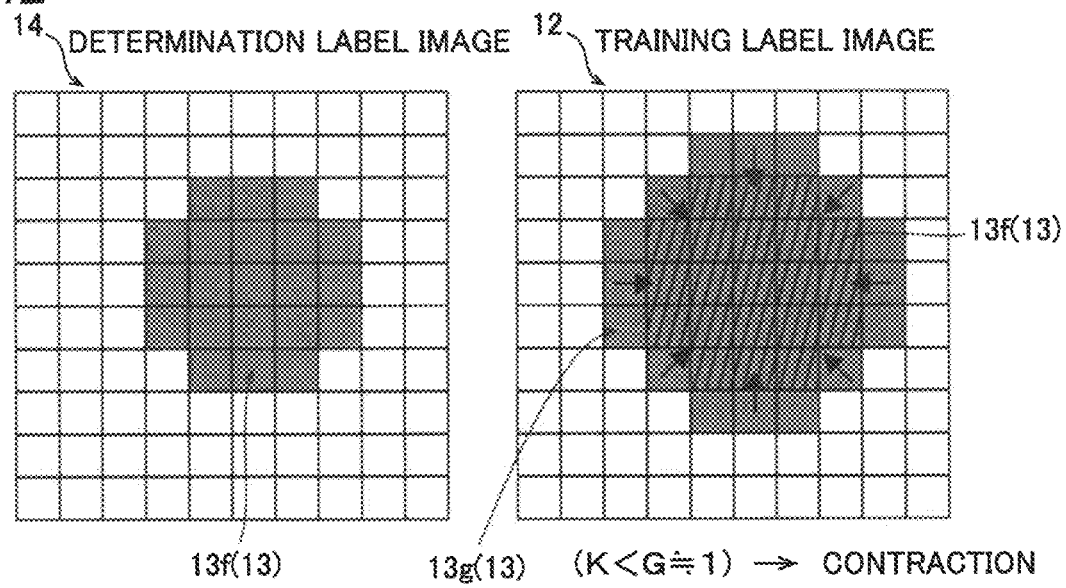
FIG. 12 is a schematic view showing an example of contracting the label area of the training label image.
Figure 13:
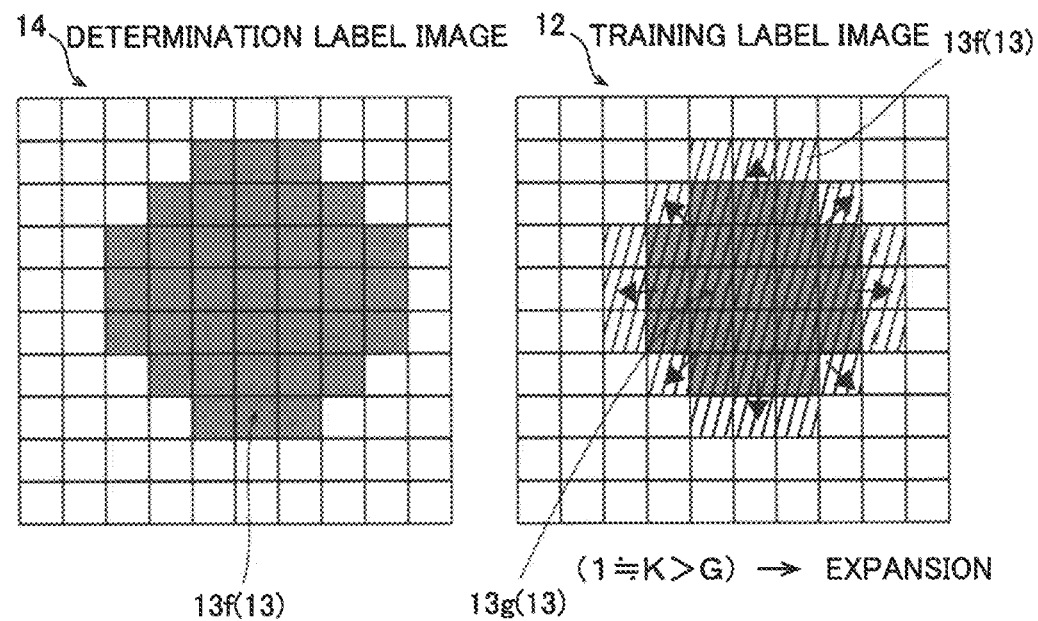
FIG. 13 is a schematic view showing an example of expanding the label area of the training label image.

The relationship between the comparison results of the non-detection evaluation value 22 and the false-detection evaluation value 23 and the size of each label area of the determination label image 14 and the training label image 12 is described using simplified virtual examples shown in FIGS. 12 and 13. In FIGS. 12 and 13, a colored portion shows the label area 13 of each image, and a hatched portion shows a label area 13$f$ of the determination label image 14 superimposed on the training label image 12.

As shown in FIG. 12, in a case in which the determination label image 14 and the training label image 12 are compared, and there are many undetected labels (the detection rate K is small), a label area 13$g$ with a positive label in the training label image 12 is larger than the label area 13$f$ with a positive label in the determination label image 14, and the boundary of the label area 13$g$ is outside the label area 13$f$ (the outside of the label area 13$f$ is undetected).

Therefore, when it is determined by the comparison of the non-detection evaluation value 22 and the false-detection evaluation value 23 that the number of undetected labels is larger than the number of falsely detected labels in the determination label image 14, in step S4 of correcting the label areas 13, the label areas 13 of the training label image 12 are contracted.

That is, when detection rate K<precision G≈1, it can be determined that there are few falsely detected labels and many undetected labels. Therefore, the ranges of the label areas 13 of the training label image 12 are contracted such that it can be brought closer to the label areas 13 of the determination label image 14. In the virtual example of FIG. 12, K=0.56 and G=1, and thus the condition (detection rate K<precision G≈1) is satisfied.

On the other hand, as shown in FIG. 13, in a case in which the determination label image 14 and the training label image 12 are compared, and there are many falsely detected labels (the precision G is small), the label area 13$g$ with a positive label in the training label image 12 is smaller than the label area 13$f$ with a positive label in the determination label image 14, and the boundary of the label area 13$g$ is inside the label area 13$f$ (the outside of the label area 13$g$ is falsely detected).

Therefore, when it is determined by the comparison of the non-detection evaluation value 22 and the false-detection evaluation value 23 that the number of falsely detected labels is larger than the number of undetected labels in the determination label image 14, in step S4 of correcting the label areas 13, the label areas 13 of the training label image 12 are expanded.

That is, when 1≈detection rate K>precision G, it can be determined that there are few undetected labels and many falsely detected labels. Therefore, the ranges of the label areas 13 of the training label image 12 are expanded such that it can be brought closer to the label areas 13 of the determination label image 14. In the virtual example of FIG. 13, K=1 and G=0.56, and thus the condition (1≈detection rate K>precision G) is satisfied. The criteria for determining the precision G≈1 and the detection rate K≈1 may be 0.8 or more, or 0.9 or more, for example.

In the first embodiment, a step of excluding the training data 10 including the training label image 12 determined to have at least one of more than a predetermined threshold number of undetected labels or more than a predetermined threshold number of falsely detected labels from the training data set 1 is further included. When at least one of the number of undetected labels or the number of falsely detected labels is greater than the predetermined threshold, at least one of the detection rate K or the precision G is below a predetermined threshold Th (K<Th and/or G<Th).

Thus, when one of the non-detection evaluation value 22 and the false-detection evaluation value 23 is out of the acceptable range (exceeds the predetermined threshold), the training label image 12 has extremely large variations in the boundaries of the label areas 13 with respect to the actual sizes, is considered to be inappropriate, and hinders training. Thus, it is preferable to exclude it from the training data set 1 rather than trying to correct it. The predetermined threshold can be set according to the number of classes or 3 the accuracy (loss function) of the pre-trained model 2$a$. For example, in the case of two-class classification, the threshold value can be set to 0.5.

In this manner, the label areas 13 of the training label image 12 are corrected in step S4. Corrections can be made on the training label images 12 of all the training data 10 included in the training data set 1. That is, in step S5, it is determined whether or not the training label images 12 of all the training data 10 have been corrected. When there is uncorrected training data (training label image 12), the process returns to step S1, and the operations in step S2 to step S4 are performed on the next selected training data 10. When the correction process for the training label images 12 of all the training data 10 is completed, the correction process for the trained model 2 is completed. In addition, a correction can be made only on a specific training label image 12. For example, thresholds for determining whether or not a correction is made are set for the loss function or the non-detection evaluation value 22 and the false-detection evaluation value 23 such that a correction can be made only on a specific training label image 12 having the loss function, or the non-detection evaluation value 22 and the false-detection evaluation value 23 that exceed the thresholds.

In the first embodiment, the label areas 13 of the training label image 12 can be corrected once or a plurality of times.

That is, in one aspect of the first embodiment, the step of creating the determination label image 14 by the trained model 2 using the training data 10 including the corrected training label image 12 (corrected training label image 12a) is further included, and in the step of correcting the label areas, the label areas 13 included in the corrected training label image 12a are corrected again based on the comparison results between the created determination label image 14 and the corrected training label image 12a. The details are described below.

(Trained Model Creation Method)

A method for creating the trained model 2 to perform image segmentation using the training label image (corrected training label image 12a) corrected by the training label image correction method is now described.

The trained model creation method includes the following steps:

(1) a step of acquiring the pre-trained model 2a by machine learning using the training data 10 including the input image 11 and the training label image 12, (2) a step of performing the segmentation process on the input image 11 of the training data 10 by the acquired pre-trained model 2a to create the determination label image 14 divided into the plurality of label areas 13, (3) a step of comparing the labels of the corresponding portions in the created determination label image 14 and the training label image 12 with each other, (4) a step of correcting the label areas 13 included in the training label image 12 based on the label comparison results, and (5) a step of creating the trained model 2 by performing machine learning using the training data 10 including the corrected training label image 12a.

Figure 14:
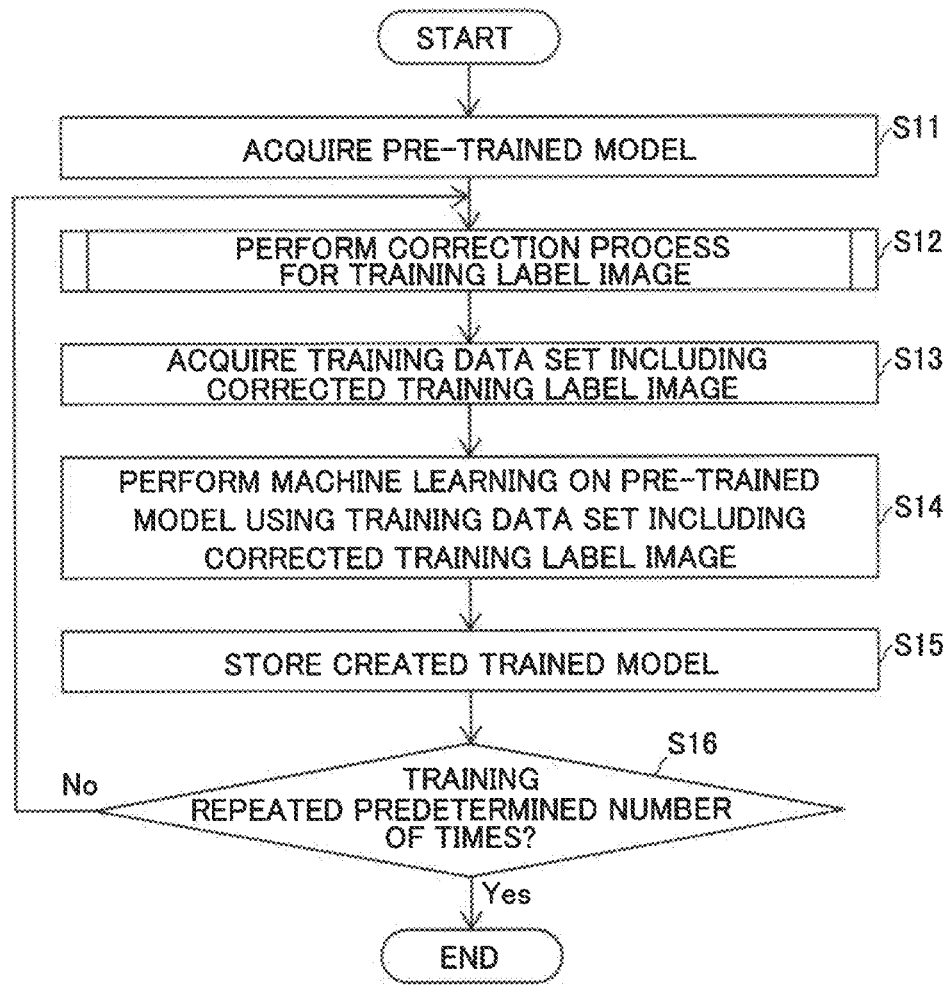
FIG. 14 is a flowchart for illustrating a trained model creation method.

FIG. 14 shows a process flow for executing the trained model creation method. In step S11, the pre-trained model 2a is acquired. In step S12, the training label image 12 included in the training data set 1 is corrected. That is, the training label image 12 of each training data 10 is corrected by performing the process operations in step S1 to step S5 shown in FIG. 10. Thus, in step S13, the corrected training data set 1 including the corrected training label image 12a is acquired.

In step S14, machine learning is performed using the training data set 1 including the corrected training label image 12a. Consequently, the pre-trained model 2a is additionally trained using the training data 10 including the corrected training label image 12a in which the variations in the boundaries of the label areas 13 have been significantly reduced or prevented such that the trained model 2 is generated. In step S16, the created trained model 2 is stored in a storage of a computer. An example in which machine learning (additional training) is performed on the pre-trained model 2a using the training data set 1 including the corrected training label image 12a is shown, but using the training data set 1 including the corrected training label image 12a, machine learning may be performed on another trained model different from the pre-trained model 2a or an untrained training model.

The trained model 2 can be created repeatedly a predetermined number of times. At this time, the correction process for the training label image 12 is also repeatedly performed. That is, in step S16, it is determined whether or not the training has been repeated the predetermined number of times. When the predetermined number of times has not been reached, the process returns to step S11, and the trained model 2 is created again.

At this time, in step S11, the trained model 2 stored in immediately preceding step S15 is acquired as the pre-trained model 2a this time. Then, in step S12, the corrected training label image 12a is corrected again using the acquired pre-trained model 2a and the training data set 1 including the corrected training label image 12a.

Then, in step S14, machine learning is performed on the pre-trained model 2a using the training data set 1 including the re-corrected corrected training label image 12a. The operations in step S11 to step S15 are repeated in this manner such that the trained model 2 is created by machine learning using the training data set 1 including the updated and modified training label image 12a while the training label image 12 included in training data set 1 is repeatedly corrected and updated. In step S16, when the training is repeated the predetermined number of times, the process is terminated.

The above training label image correction method and trained model creation method are executed by a computer (such as a personal computer, a workstation, or a supercomputer) in which specified software (program) is installed in a storage, or a computer system including a plurality of computers. The computer includes a processor such as a CPU, GPU, or a specially designed FPGA, and a storage such as a ROM, a RAM, or a volatile or non-volatile storage device (such as an HDD or an SDD).

Figure 15:
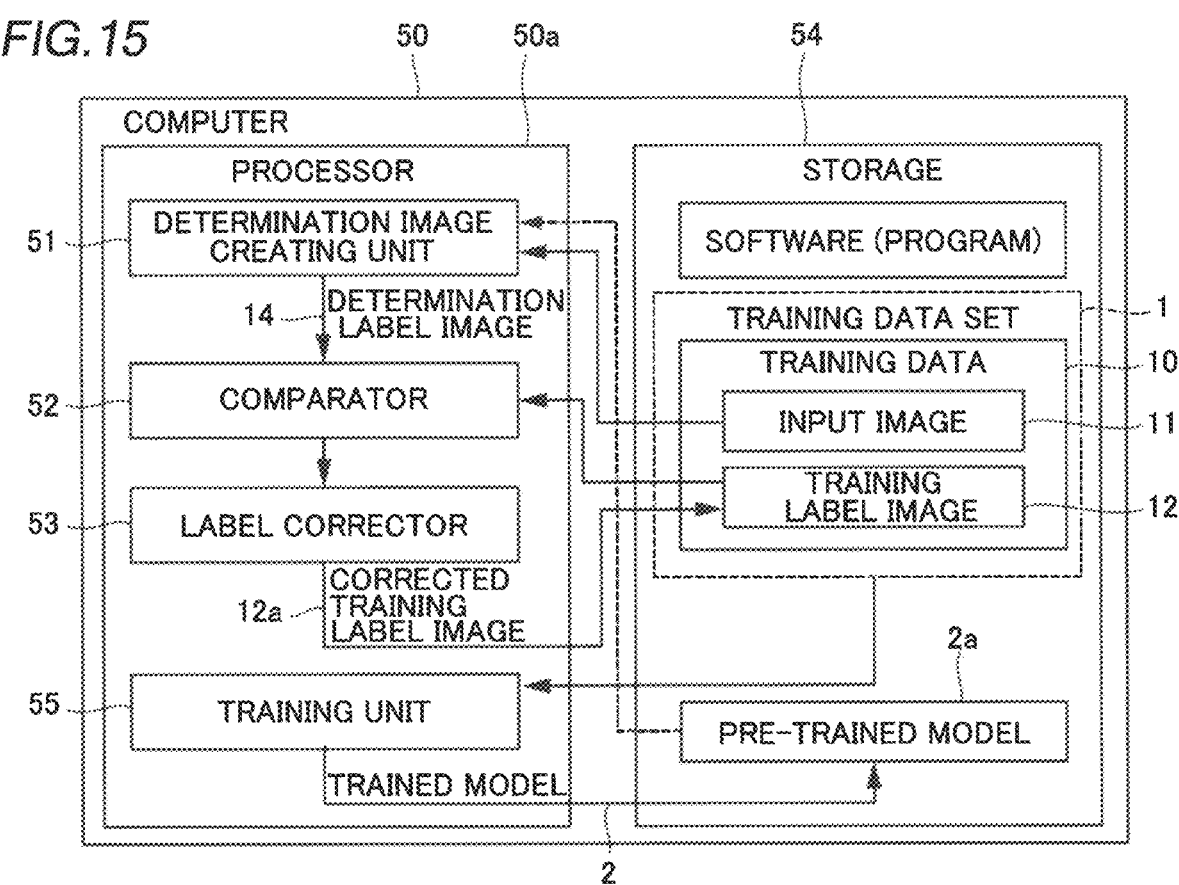
FIG. 15 is a block diagram for illustrating a training data processor.

As shown in FIG. 15, a processor 50a of the computer functions as a training data processor 50 to execute the training label image correction method and the trained model creation method by executing programs stored in a storage 54.

<Training Data Processor>

The training data processor 50 that executes the training label image correction method according to the first embodiment includes functional blocks to perform the operations in the steps (step S1 to step S5 in FIG. 10) of the training label image correction method, and can execute the training label image correction method by the process using various data (the pre-trained model 2a and the training data set 1) stored in the storage 54. The training data processor 50 that executes the trained model creation method according to the first embodiment includes functional blocks to perform the operations in the steps (step S11 to step S16 in FIG. 14) of the trained model creation method, and can execute the trained model creation method by the process using various data stored in the storage 54.

Specifically, the training data processor 50 includes a determination image creating unit 51, a comparator 52, and a label corrector 53 as the functional blocks. The training data processor 50 that executes the trained model creation method according to the first embodiment further includes a training unit 55 as the functional block. When only correcting the training label image 12, the training data processor 50 does not need to include the training unit 55. Various data such as the training data set 1 and the trained model 2 (pre-trained model 2a) and programs are stored in the storage 54.

The training data processor 50 selects the training data 10 in step S1 of FIG. 10. The determination image creating unit 51 is configured to create the determination label image 14 by performing the segmentation process on the input image 11 of the training data 10 including the input image 11 and the training label image 12 with the trained model 2 stored in the storage 54 as the pre-trained model 2a. The determination image creating unit 51 performs the process operation in step S11 of FIG. 14 and the process operations in step S1 and step S2 of FIG.

The comparator 52 is configured to compare the labels of the corresponding portions in the determination label image 14 created by the determination image creating unit 51 and the training label image 12 with each other. That is, the comparator 52 performs the process operation in step S3 of FIG. 10.

The label corrector 53 is configured to correct the label areas 13 included in the training label image 12 based on the label comparison results by the comparator 52. That is, the label corrector 53 performs the process operation in step S4 of FIG. 10.

The training data processor 50 repeats the selection of the training data 10 and the correction of the training label image 12 until all the training data 10 is selected in step S5 of FIG. 10.

The training unit 55 is configured to create (update) the trained model 2 by performing machine learning using the training data 10 including the corrected training label image 12a. That is, the training unit 55 performs the process operations in step S13 to step S15 of FIG. 14. The training data processor 50 repeats the correction of the training label image 12 and the re-training of the trained model 2 the predetermined number of times in step S16 of FIG. 14.

(Image Analysis Device)

An example of an image analysis device that performs image analysis (image segmentation) using the trained model 2 created by the above trained model creation method is now described.

(Example of Configuration of Image Analysis Device: Cell Analysis Device)

Figure 16:
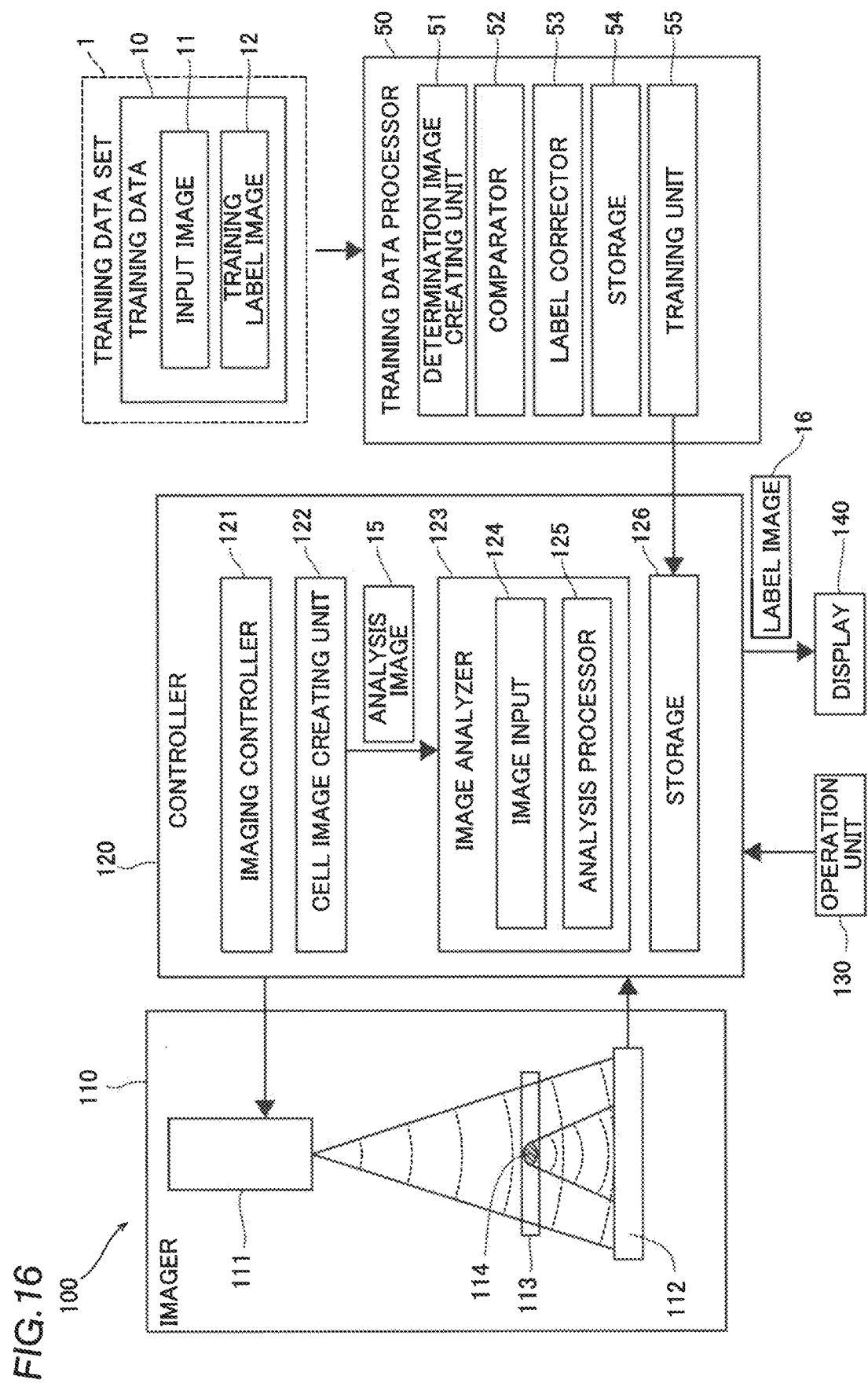
FIG. 16 is a block diagram showing a first example of an image analysis device.

As a first example of the image analysis device, an image analysis device 100 shown in FIG. 16 is a cell analysis device that analyzes a cell image obtained by imaging a cell.

The image analysis device 100 is configured to perform cell segmentation on an in-line holographic microscopic (IHM) phase image, which is the analysis image in which a cell has been imaged. The image analysis device 100 creates the label image 16 divided for each area of the cell to be detected from the cell image by the segmentation process.

The image analysis device 100 includes an imager 110, a controller 120, an operation unit 130, which is a user interface, a display 140, and the training data processor 50.

The imager 110 is an in-line holographic microscope, and includes a light source 111 including a laser diode, for example, and an image sensor 112. At the time of imaging, a culture plate 113 including a cell colony (or a single cell) 114 is arranged between the light source 111 and the image sensor 112.

The controller 120 is configured to control the operation of the imager 110 and process data acquired by the imager 110. The controller 120 is a computer including a processor and a storage 126, and the processor includes an imaging controller 121, a cell image creating unit 122, and an image analyzer 123 as functional blocks.

The image analyzer 123 includes an image input 124 that receives an input of the analysis image 15 and an analysis processor 125 that performs a segmentation process for the analysis image 15 using a trained model 2 by machine learning to create a label image divided into a plurality of label areas 13 as lower functional blocks.

The training data processor 50 has the same configuration as that shown in FIG. 15, and thus description thereof is omitted. The trained model 2 created in the training data processor 50 is stored in the storage 126 of the controller 120 and used for the cell segmentation process by the image analyzer 123.

When the culture plate 113 including the cell colony 114 is set at a predetermined position of the imager 110 by an operator and the controller 120 receives a predetermined operation via the operation unit 130, the controller 120 controls the imager 110 with the imaging controller 121 to acquire hologram data.

Specifically, the imager 110 radiates coherent light from the light source 111, and acquires, with the image sensor 112, an image of interference fringes of light transmitted through the culture plate 113 and the cell colony 114 and light transmitted through an area in the vicinity of the cell colony 114 on the culture plate 113. The image sensor 112 acquires hologram data (two-dimensional light intensity distribution data of a hologram formed on a detection surface).

The cell image creating unit 122 calculates phase information by performing an arithmetic process for phase recovery on the hologram data acquired by the imager 110. Furthermore, the cell image creating unit 122 creates the IHM phase image (analysis image 15) based on the calculated phase information. Known techniques can be used for the calculation of the phase information and a method for creating the IHM phase image, and thus detailed description thereof is omitted.

<Cell Image Analyzer>

The cell image shown in FIG. 4 is an example of the IHM phase image targeting an undifferentiated deviant cell colony in an iPS cell. In the image analysis device 100, the segmentation process is performed on the IHM phase image by the image analyzer 123 such that an area division process of dividing the IHM phase image (analysis image into the label area 13c of the undifferentiated cell, the label area 13d of the undifferentiated deviant cell, and the label area 13e of the background is automatically performed.

Figure 17:
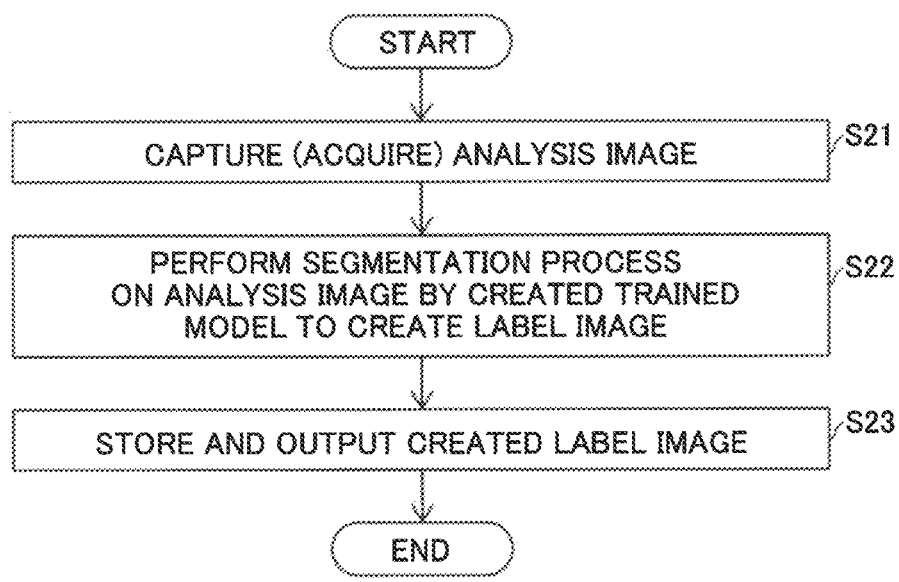
FIG. 17 is a flowchart for illustrating an image analysis process of the image analysis device.

As shown in FIG. 17, in step S21, the image input 124 acquires the IHM phase image, which is the analysis image 15. In step S22, the analysis processor 125 performs the segmentation process on the analysis image 15 by the trained model 2 stored in the storage 126. Thus, the label image 16 in which the analysis image 15 input this time has been divided into the plurality of label areas 13 is created. In step S23, the image analyzer 123 stores the created label image 16 in the storage 126, and outputs the created label image 16 to the display 140 and an external server, for example.

In the image analyzer 123, in addition to the segmentation process, various analysis processes based on the results of the segmentation process can be performed. For example, the image analyzer 123 estimates at least one of the area of the cell area, the number of cells, or the density of the cells based on the label image 16 obtained by the segmentation process.

(Example of Configuration of Image Analysis Device: Bone Image Analysis Device)

Figure 18:
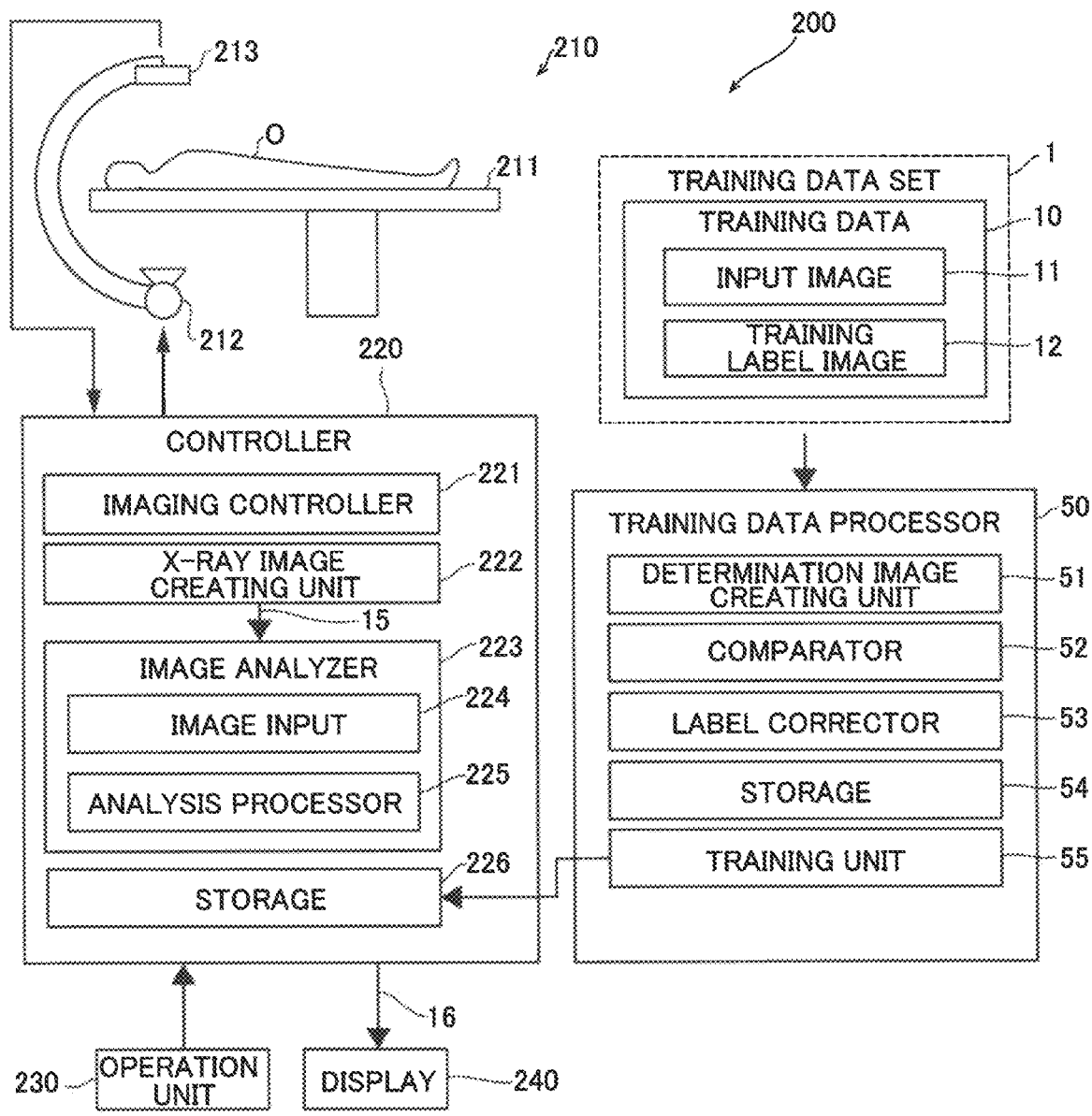
FIG. 18 is a block diagram showing a second example of an image analysis device.

As a second example of the image analysis device, an image analysis device 200 shown in FIG. 18 is a bone image analysis device that analyzes an X-ray image of an area including the bone of a subject.

The image analysis device 200 is configured to perform bone segmentation on an X-ray image, which is the analysis image 15 in which the bone has been imaged. The image analysis device 200 creates the label image 16 of the bone obtained by dividing a bone area from the X-ray image by the segmentation process.

The image analysis device 200 includes an imager 210, a controller 220, an operation unit 230, a display 240, and the training data processor 50.

The imager 210 includes a table 211, an X-ray irradiator 212, and an X-ray detector 213. The table 211 is configured to support a subject O (person). The X-ray irradiator 212 is configured to irradiate the subject O with X-rays. The X-ray detector 213 includes a flat panel detector (FPD), for example, and is configured to detect X-rays radiated from the X-ray irradiator 212 and transmitted through the subject O. With the imager 210, for example, as shown in FIG. 2, the X-ray image of the area including the bone of the subject is acquired as the analysis image 15.

The controller 220 is a computer including a processor and a storage 226, and the processor includes an imaging controller 221, an X-ray image creating unit 222, and an image analyzer 223 as functional blocks.

The image analyzer 223 includes an image input 224 and an analysis processor 225 as lower functional blocks, similarly to the example shown in FIG. 16.

The training data processor 50 has the same configuration as that shown in FIG. 15, and thus description thereof is omitted. The trained model 2 created in the training data processor 50 is stored in the storage 226 of the controller 220 and used for the bone segmentation process by the image analyzer 223.

The training label image 12 for performing the bone segmentation process can be created using the CT image (computed tomography image) data of the subject in addition to the X-ray image. Specifically, a virtual projection is performed on the CT image data of the subject by simulating the geometrical conditions of the X-ray irradiator 212 and the X-ray detector 213 to generate a plurality of DRR images (digital reconstruction simulation images) showing the area including the bone, and an area in which a CT value is above a certain level is labeled as the bone area such that the training label image 12 can be created. The training data processor 50 can acquire a CT image from a CT imaging device (not shown) and generate the training label image 12 based on the acquired CT image.

As shown in FIG. 17, in step S21, the image input 224 acquires the X-ray image, which is the analysis image 15. In step S22, the analysis processor 225 performs the segmentation process on the analysis image 15 by the trained model 2 stored in the storage 226. Thus, the label image 16 in which the analysis image 15 input this time is divided into the plurality of label areas 13 is created. In step S23, the image analyzer 223 stores the created label image 16 in the storage 226 and outputs the created label image 16 to the display 240 and an external server, for example.

In the image analyzer 223, in addition to the segmentation process, various analysis processes based on the results of the segmentation process can be performed. For example, the image analyzer 223 estimates the density of the detected bone based on the label image 16 (see FIG. 3) obtained by the segmentation process.

In FIGS. 15, 16, and 18, instead of constructing the training data processor 50 and each of the controllers 120 and 220 as functional blocks achieved by the processor executing software, the training data processor 50 and each of the controllers 120 and 220 may be constructed by dedicated hardware for performing each process.

Advantages of First Embodiment

In the first embodiment, the following advantages are obtained.

In the first embodiment, as described above, the determination label image 14 is created, the labels of the corresponding portions in the created determination label image 14 and the training label image 12 are compared with each other, and the label areas 13 included in the training label image 12 are corrected based on the label comparison results. Thus, the label areas 13 of the training label image 12 are corrected based on the comparison results between the determination label image 14 and the training label image 12 with reference to the determination label image 14, and thus the variations in the boundaries can be reduced based on consistent criteria by automatic correction using a computer instead of a label correction operator. Accordingly, correction of the training label image 12 used for machine learning of the image segmentation process can be simplified while ensuring the accuracy.

In the first embodiment, as described above, in the step of correcting the label areas 13, the ranges of the label areas 13 in the training label image 12 are corrected so as to be closer to the label areas 13 of the determination label image 14 based on the label comparison results. Accordingly, the ranges of the label areas 13 in the training label image 12 are simply matched with the label areas 13 of the determination label image 14 or are simply set to intermediate ranges between the label areas 13 of the training label image 12 and the label areas 13 of the determination label image 14, for example, such that a correction can be easily and effectively made to reduce the variations in the label areas 13 of the individual training label image 12.

In the first embodiment, as described above, in the step of correcting the label areas 13, correction of the label areas 13 is performed by at least one of expansion or contraction of the label areas 13 in the training label image 12. Accordingly, the label areas 13 of the training label image 12 can be corrected by a simple process of expanding or contracting the ranges of the label areas 13 in the training label image 12 based on the label comparison results.

In the first embodiment, as described above, in the step of correcting the label areas 13, the range of the label area 13 to which the label of interest has been assigned is corrected based on the matching portion and the non-matching portion with the training label image 12 in the determination label image 14. Accordingly, it is possible to understand, from the matching portions and the non-matching portions between the determination label image 14 and the training label image 12, how the label area 13 of the training label image 12 deviates from the reference determination label image 14. Therefore, the label area 13 can be easily corrected based on the matching portion and the non-matching portion such that the variation in the boundary is reduced.

In the first embodiment, as described above, in the step of comparing the labels, the non-detection evaluation value 22 for evaluating undetected labels in the determination label image 14 and the false-detection evaluation value 23 for evaluating falsely detected labels in the determination label image 14 are acquired based on the matching portion and the non-matching portion, and in the step of correcting the label areas 13, the label areas 13 of the training label image 12 are corrected based on the comparison between the non-detection evaluation value 22 and the false-detection evaluation value 23. Thus, the non-detection evaluation value 22 and the false-detection evaluation value 23 are compared such that it is possible to understand how the label areas 13 of the training label image 12 should be corrected (whether it should be increased or decreased), and thus the label areas 13 of the individual training label image 12 can be more appropriately corrected.

In the first embodiment, as described above, when it is determined by comparing the non-detection evaluation value 22 with the false-detection evaluation value 23 that there are more falsely detected labels than the undetected labels in the determination label image 14, in the step of correcting the label areas 13, the label areas 13 of the training label image 12 are expanded. Accordingly, when there are many falsely detected areas and it is estimated that the label areas 13 of the training label image 12 are smaller than the label areas 13 of the reference determination label image 14, the label areas 13 of the training label image 12 are expanded such that a correction can be easily made to reduce the variations in the boundaries of the label areas 13.

In the first embodiment, as described above, when it is determined by comparing the non-detection evaluation value 22 with the false-detection evaluation value 23 that there are more undetected labels than the falsely detected labels in the determination label image 14, in the step of correcting the label areas 13, the label areas 13 of the training label image 12 are contracted. Accordingly, when there are many undetected areas and it is estimated that the label areas 13 of the training label image 12 are larger than the label areas 13 of the reference determination label image 14, the label areas 13 of the training label image 12 are contracted such that a correction can be easily made to reduce the variations in the boundaries of the label areas 13.

In the first embodiment, as described above, the step of excluding the training data 10 including the training label image 12 determined to have at least one of more than a predetermined threshold number of undetected labels or more than a predetermined threshold number of falsely detected labels from the training data set is further included. Accordingly, when at least one of the number of undetected labels or the number of falsely detected labels is excessively large in the comparison with the reference determination label image 14, the training label image 12 is considered to be inappropriate as the training data 10. Therefore, the training label image 12 in which at least one of the number of undetected labels or the number of falsely detected labels is large is excluded from the training data set such that the training data 10 that is a factor that lowers the accuracy of machine learning can be excluded. Thus, the quality of the training data set can be improved, and highly accurate machine learning can be performed.

In the first embodiment, as described above, in the step of comparing the labels, the labels of the corresponding portions of the determination label image 14 and the training label image 12 are compared with each other for each image pixel. Accordingly, the determination label image 14 and the training label image 12 can be compared with each other on a pixel-by-pixel basis, and thus the variations in the label areas 13 of the training label image 12 can be evaluated more accurately.

In the first embodiment, as described above, the step of creating the determination label image 14 by the trained model 2 using the training data 10 including the corrected training label image (corrected training label image 12a) is further included, and in the step of correcting the label areas 13, the label areas 13 included in the corrected training label image 12a are corrected again based on the comparison results between the created determination label image 14 and the corrected training label image 12a. Accordingly, machine learning is performed using the corrected training label image 12a, and then the determination label image 14 is created again such that the label areas 13 of the training label image 12 can be repeatedly corrected. The label areas 13 are repeatedly corrected such that the variations in the label areas 13 of the training label image 12 can be further reduced.

In the trained model creation method according to the first embodiment, as described above, the label areas 13 included in the training label image 12 are corrected based on the label comparison results between the determination label image 14 and the training label image 12. Accordingly, the correction of the training label image 12 used for machine learning of the image segmentation process can be simplified while ensuring the accuracy. Furthermore, the trained model 2 is created by performing machine learning on the pre-trained model 2a using the training data 10 including the corrected training label image 12a, and thus the trained model 2 with significantly reduced determination variations in the boundary portions of the label areas 13, which is capable of a high-quality segmentation process, can be obtained.

In the image analysis devices 100 and 200 according to the first embodiment, as described above, the determination image creating unit 51 configured to create the determination label image 14, the comparator 52 configured to compare the labels of the corresponding portions in the determination label image 14 created by the determination image creating unit 51 and the training label image 12 with each other, and the label corrector 53 configured to correct the label areas 13 included in the training label image 12 based on the label comparison results by the comparator 52 are provided. Accordingly, the correction of the training label image 12 used for machine learning of the image segmentation process can be simplified while ensuring the accuracy.

Second Embodiment

A training label image correction method according to a second embodiment is now described with reference to FIGS. 19 and 20. In the second embodiment, an example is described in which the amount of correction is adjusted according to the label priorities when a correction is made by expanding or contracting label areas in addition to the training label image correction method according to the first embodiment.

Figure 19:
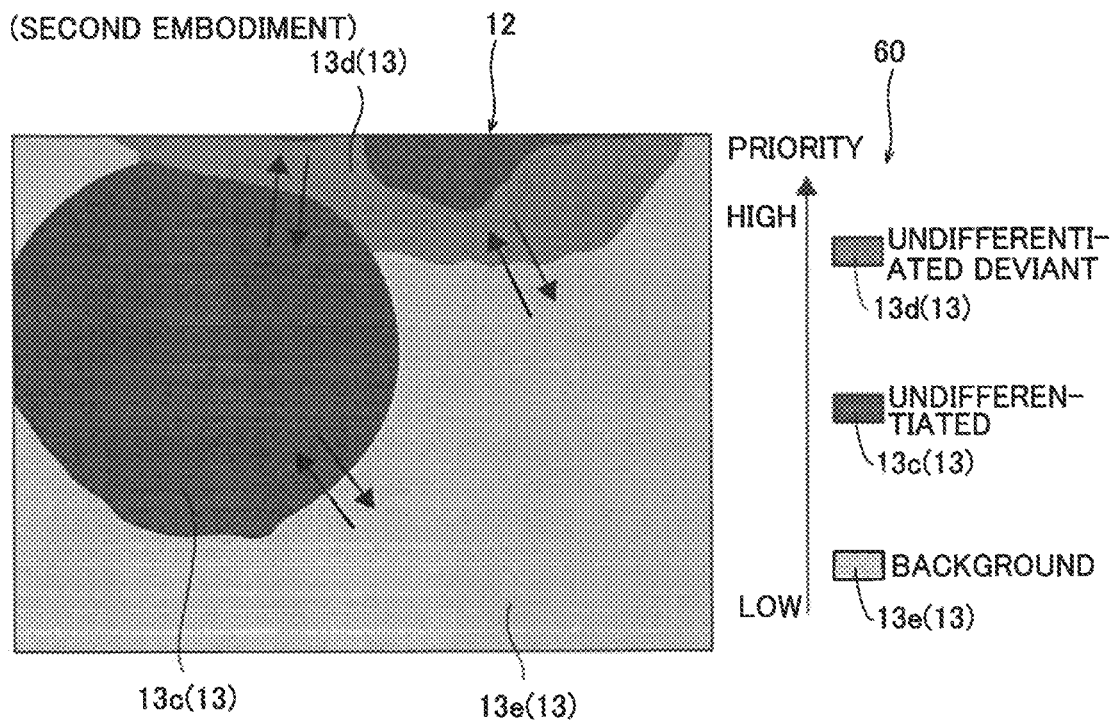
FIG. 19 is a diagram for illustrating the label priorities in a second embodiment.

As shown in FIG. 19, the training label image correction method according to the second embodiment further includes a step of setting priorities 60 between labels of a training label image 12. Furthermore, in a step of correcting label areas 13, the amounts of correction of the label areas 13 are adjusted according to the priorities 60.

For example, FIG. 19 shows an example in which three labels of an undifferentiated cell, an undifferentiated deviant cell, and a background are set on a cell image of a pluripotent stem cell, and the cell image is divided by a segmentation process into label areas 13 to which the three labels have been assigned.

This cell image is used to prevent an undifferentiated cell that maintains pluripotency from differentiating by finding an undifferentiated deviant cell in a cell colony and removing it, and to culture only the undifferentiated cell when a pluripotent stem cell is cultured. That is, it is desired to reliably find an undifferentiated deviant cell, and thus among the labels of an undifferentiated cell, an undifferentiated deviant cell, and a background, the priorities 60 are set higher in the order of a background, an undifferentiated cell, and an undifferentiated deviant cell.

In the second embodiment, in the step of correcting the label areas 13, when the label areas 13 of the training label image 12 are corrected, expansion of the label areas 13 having a lower priority to the label areas 13 having a higher priority is prohibited. That is, the amounts of correction of the label areas 13 are adjusted according to the priorities 60 such that the label areas 13 having a higher priority are not reduced by the expansion of the label areas 13 having a lower priority.

Figure 20:
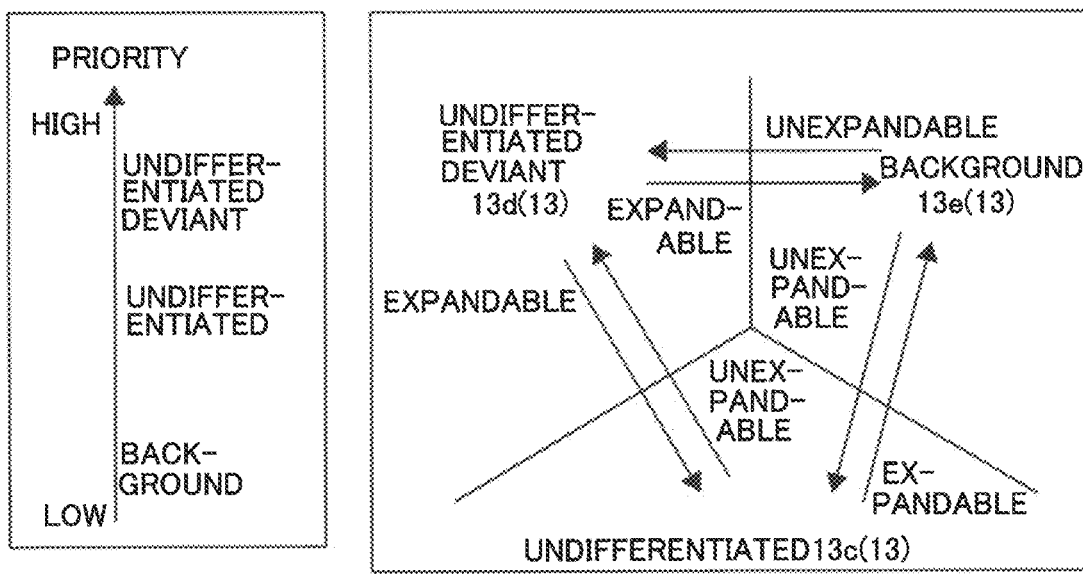
FIG. 20 is a diagram for illustrating adjustment of the amounts of correction of label areas according to the label priorities.

In an example of FIG. 20, when the label areas 13 are corrected by expansion, expansion of a label area 13e of the background to a label area 13c of the undifferentiated cell and a label area 13d of the undifferentiated deviant cell is prohibited. Furthermore, expansion of the label area 13c of the undifferentiated cell to the label area 13d of the undifferentiated deviant cell is prohibited.

On the other hand, when the label areas 13 are corrected by expansion, expansion of the label area 13d of the undifferentiated deviant cell to the label area 13c of the undifferentiated cell and the label area 13e of the background is allowed. Furthermore, expansion of the label area 13c of the undifferentiated cell to the label area 13e of the background is allowed. Consequently, in the second embodiment, in the training label image 12, a correction in a direction in which the label areas 13 having a label with a higher priority are reduced is restricted.

The remaining configurations of the second embodiment are similar to those of the first embodiment. In another configuration example of the second embodiment, expansion of the label areas 13 having a lower priority to the label areas 13 having a higher priority may not be prohibited. For example, the amount of expansion from the label area 13c having a lower priority to the label area 13d having a higher priority is smaller than the amount of expansion from the label area 13d having a higher priority to the label area 13c having a lower priority. Even in this manner, the correction in the direction in which the label areas 13 having a label with a higher priority are reduced can be restricted.

Advantages of Second Embodiment

In the second embodiment, the following advantages are obtained.

In the second embodiment, similarly to the first embodiment described above, correction of the training label image 12 used for machine learning of the image segmentation process can be simplified while ensuring the accuracy.

In the second embodiment, as described above, the step of setting the priorities 60 between the labels of the training label image 12 is further included, and in the step of correcting the label areas 13, the amounts of correction of the label areas 13 are adjusted according to the priorities 60. Accordingly, the amount of correction of a label with a higher priority can be intentionally biased such that detection omissions can be significantly reduced or prevented as much as possible. Consequently, the training label image 12 can be appropriately corrected according to the purpose of the segmentation process.

In the second embodiment, as described above, in the step of correcting the label areas 13, when the label areas 13 of the training label image 12 are corrected, expansion of the label areas 13 having a lower priority to the label areas 13 having a higher priority are prohibited. Accordingly, even when the label areas 13 having a lower priority (the label area 13c, for example) are corrected by expansion, the label areas 13 having a higher priority (the label area 13d, for example) can be preserved. Therefore, it is possible to obtain the training label image 12 (training data 10) capable of being learned, in which detection omissions of the label areas 13 with a higher priority are significantly reduced or prevented while variations in the boundaries are significantly reduced or prevented according to the purpose of the segmentation process.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while as examples of an image, the cell image and the X-ray image have been shown in the aforementioned embodiment, the present invention is not limited to this. The correction of the training label image according to the present invention can be applied to any image as long as the same is a training label image used for machine learning of the segmentation process. The correction of the training label image according to the present invention is to correct variations in the boundaries of the label areas, and thus it is particularly suitable in the field in which high accuracy is required at the boundary portions of the label areas. As such an image, there is a so-called medical image particularly used in the medical field (the healthcare field or the medical science field). The medical image is used to diagnose a disease by a doctor, for example, and thus it is desired to significantly reduce or prevent the blurring or the unnatural shapes of the boundaries as much as possible even when the boundary portions of the label areas are fine. Therefore, the present invention, which can reduce variations in the boundaries of the label areas by correcting the training label image, is particularly suitable when used for segmentation of a medical image. As the medical image, in addition to a cell image and an X-ray image of a bone and other portions, an image showing a tumor (such as an endoscopic image) in a case in which a segmentation process is performed on a tumor area to be treated as a detection target may be used, for example.

Figure 21:
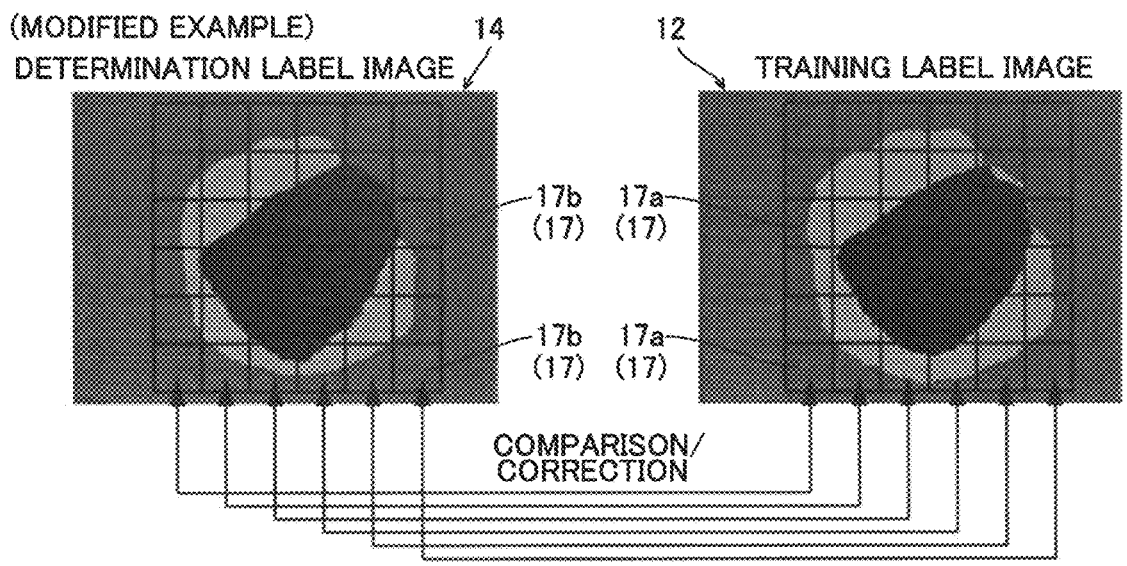
FIG. 21 is a diagram showing a modified example in which label area correction is performed for each partial image.

While the example in which the entire training label image 12 is compared with the determination label image 14 pixel for each pixel, and a correction is made based on the comparison results has been shown in each of the aforementioned first and second embodiments, the present invention is not limited to this. In the present invention, a portion of the training label image 12 may be compared with the determination label image 14, and a correction may be made. For example, in a modified example of the training label image correction method shown in FIG. 21, in a step of correcting label areas 13, a training label image 12 is divided into a plurality of partial images 17, and the label areas 13 are corrected for at least one partial image 17 of the divided training label image 12. In FIG. 21, the training label image 12 is divided into a matrix so as to have 6×6 rectangular partial images 17a. Then, in the modified example, a determination label image 14 is also divided into partial images 17b, the training label image 12 and the determination label image 14 are compared with each other for each partial image 17 (17a, 17b), and the partial images 17 of the training label image 12 are corrected based on the comparison results. The shape of each partial image 17 and the number of divisions are not particularly limited and are arbitrary. The correction may be made only for specific one or more partial images 17, or may be made for all the partial images 17. With the configuration as in this modified example, only a specific portion of the training label image 12 can be corrected, or each small portion can be corrected individually.

While the example in which the image analysis devices 100 and 200 perform the correction process on the training label image 12 has been shown in the aforementioned first embodiment, the present invention is not limited to this. The correction process for the training label image 12 may be performed by another device other than the image analysis devices. Similarly, while the example in which the image analysis devices 100 and 200 create the trained model 2 by machine learning has been shown in each of the aforementioned first and second embodiments, the trained model 2 may be created by another device other than the image analysis devices.

Figure 22:
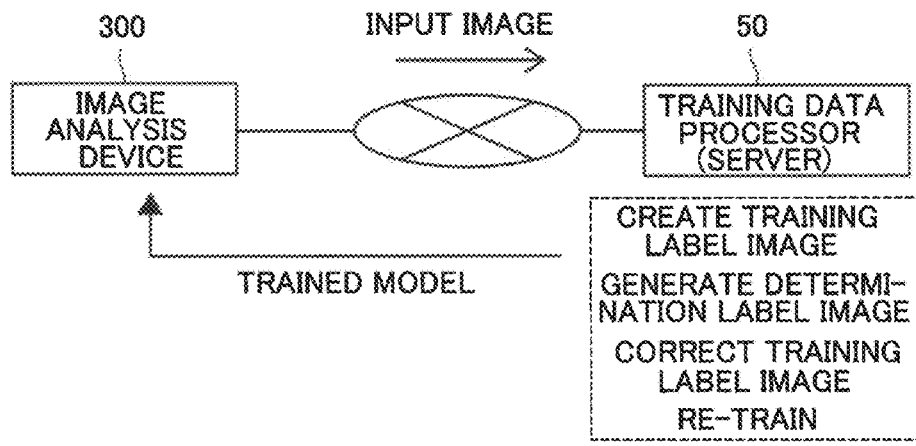
FIG. 22 is a schematic view showing a modified example in which training label image correction and trained data creation are performed on the server side.

For example, in a modified example shown in FIG. 22, a training data processor 50 is provided as a server device separate from an image analysis device 300, and is connected to the image analysis device 300 via a network. The training data processor 50 acquires, from the image analysis device 300, a newly captured analysis image 15 as an input image 11 of training data 10 for machine learning. A training label image 12 is created from the input image 11 by the training data processor 50 or using another image processing device, and the training data 10 including the input image 11 and the training label image 12 is added to a training data set 1. The training data processor 50 creates a determination label image 14 from the input image 11 by a pre-trained model 2a, compares it with the training label image 12, and corrects the training label image 12 based on the comparison results. The training data processor 50 re-trains the pre-trained model 2a using the corrected training label image 12 and creates (updates) a trained model 2. The training data processor 50 transmits the newly created trained model 2 to the image analysis device 300 via the network. Thus, the image analysis device 300 can perform a segmentation process using the newly created trained model 2.

Figure 23:
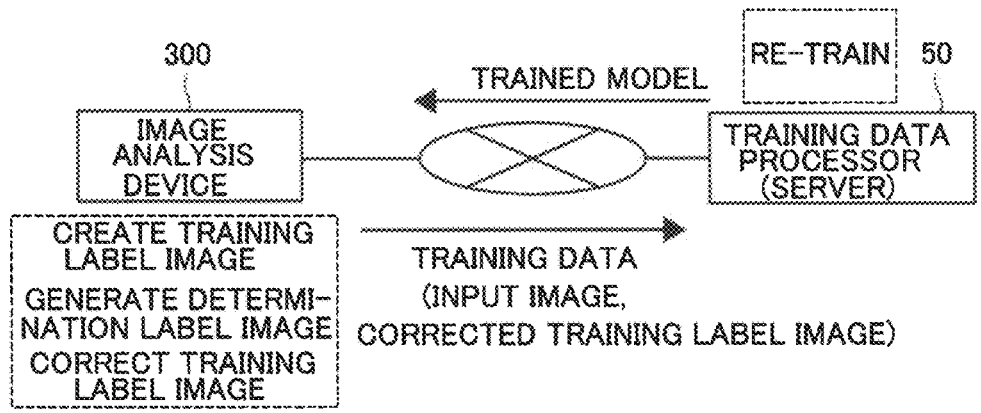
FIG. 23 is a schematic view showing a modified example in which training label image correction is performed on the image analysis device side and trained data creation is performed on the server side.

Furthermore, for example, in a modified example shown in FIG. 23, a training label image 12 is corrected in an image analysis device 300. A trained model 2 is created on the training data processor 50 side. On the image analysis device 300 side, the training label image 12 is created using a newly captured analysis image 15 as an input image 11 of training data 10. The training data 10 including the input image 11 and the training label image 12 is added to a training data set 1. The image analysis device 300 creates a determination label image 14 from the input image 11 by a pre-trained model 2a, compares it with the training label image 12, and corrects the training label image 12 based on the comparison results. The image analysis device 300 transmits the training data 10 including the input image 11 and a corrected training label image 12a to the training data processor 50 via a network. The training data processor 50 adds the transmitted training data 10 to the training data set 1, re-trains the pre-trained model 2a, and creates (updates) the trained model 2. The training data processor 50 transmits the newly created trained model 2 to the image analysis device 300 via the network. Thus, the image analysis device 300 can perform a segmentation process using the newly created trained model 2.

Thus, the training label image correction method and the trained model creation method according to the present invention may be executed in the form of a so-called cloud service or the like by the cooperation of a plurality of computers connected to the network.

While the example in which the label areas 13 of the training label image 12 are corrected by the morphology process has been shown in the aforementioned first embodiment, the present invention is not limited to this. In the present invention, the label areas may be corrected by a method other than the morphology process. For example, when the number of undetected or falsely detected labels is greater than a predetermined threshold, the label areas 13 of the training label image 12 may be replaced with the label areas 13 of the determination label image 14. Alternatively, for example, the boundaries of the label areas 13 of the corrected training label image 12a may be corrected so as to be located between the boundaries of the label areas 13 of the training label image 12 and the boundaries of the label areas 13 of the determination label image 14. In these cases, it is not always necessary to use the non-detection evaluation value 22 and the false-detection evaluation value 23 unlike the first embodiment.

While the example in which the detection rate K shown in the above formula (1) is used as the non-detection evaluation value 22, and the precision G shown in the above formula (2) is used as the false-detection evaluation value 23 has been shown in the aforementioned first embodiment, the present invention is not limited to this. For example, instead of either the detection rate K or the precision G, Intersection over Union (IoU) shown in the following formula (3) or an F value shown in the following formula (4) may be used.

$$IoU = TP/(-+FN+FP) \quad (3)$$

$$F \text{ value} = 2K \times G/(K+G) \quad (4)$$

Note that K in the above formula (4) is a detection rate shown in the above formula (1), and G is a precision shown in the above formula (2).

These IoU and F value are complex indexes for evaluating both undetected and falsely detected labels, and correspond to both the non-detection evaluation value 22 and the false-detection evaluation value 23. The IoU or F value is used in combination with the detection rate K or the precision G such that undetected labels and falsely detected labels can be evaluated separately. For example, when IoU and the detection rate K are used, it is determined that there are few falsely detected labels and many undetected labels when $K \approx IoU \ll 1$, and it is determined that there are few undetected labels and many falsely detected labels when $1 \approx K > IoU$.

In the first embodiment, the non-detection evaluation value 22 and the false-detection evaluation value 23 have been described on the premise of the two-class confusion matrix 21 shown in FIG. 11, but the same are also applicable to a multi-class segmentation process of three or more classes. Although the description is omitted, even in the case of three or more classes, the non-detection evaluation value and the false-detection evaluation value such as the detection rate and the precision may be obtained from a confusion matrix according to the number of classes.

DESCRIPTION OF REFERENCE NUMERALS

1: training data set
2: trained model
2a: pre-trained model
10: training data
11: input image
12: training label image
12a: corrected training label image
13, 13a, 13b, 13c, 13d, 13e, 13f, 13g: label area
14: determination label image
15: analysis image
16: label image
17, 17a, 17b: partial image
22: non-detection evaluation value
23: false-detection evaluation value
51: determination image creating unit
52: comparator
53: label corrector
54: storage
60: priority
100, 200: image analysis device
124, 224: image input
125, 225: analysis processor
126, 226: storage

The invention claimed is:

1. A method for generating training data sets for machine learning comprising:
preparing a pre-trained model for performing a segmentation process the pre-trained model trained based on training data sets, each of the training data sets including an input image and a training label image, the training label image including a plurality of divided first label areas,
performing the segmentation process on the input image for one of the training data sets to output a determination label image including a plurality of divided second label areas;
comparing the first label areas of the training label image and the second label areas of the determination label image; and
correcting the first label areas based on the step of comparing the first and second label areas.

2. The method for generating the training data sets for the machine learning according to claim 1, wherein the correcting the first label areas includes correcting ranges of the first label areas in the training label image so as to be closer to the second label areas of the determination label image based on a label comparison result.

3. The method for generating the training data sets for the machine learning according to claim 2, wherein the correcting the first label areas includes correcting the first label areas by at least one of expansion or contraction of the first label areas in the training label image.

4. The method for generating the training data sets for the machine learning according to claim 1, wherein:
the comparing the first label areas of the training label image and the second label areas of the determination label image includes acquiring a matching portion and a non-matching portion with the training label image in the determination label image for a label of interest by comparing the determination label image with the training label image; and
the correcting the first label areas includes correcting a range of a first label area with the label of interest based on the matching portion and the non-matching portion.

5. The method for generating the training data sets for the machine learning according to claim 4, wherein:
the comparing the first label areas of the training label image and the second label areas of the determination label image includes acquiring a non-detection evaluation value for evaluating undetected labels in the determination label image and a false-detection evaluation value for evaluating falsely detected labels in the determination label image based on the matching portion and the non-matching portion; and
the correcting the first label areas includes correcting the first label areas of the training label image based on a comparison between the non-detection evaluation value and the false-detection evaluation value.

6. The method for generating the training data sets for the machine learning according to claim 5, wherein the correcting the first label areas includes expanding the first label areas of the training label image when it is determined by the comparison between the non-detection evaluation value and the false-detection evaluation value that there are more falsely detected labels than undetected labels in the determination label image.

7. The method for generating the training data sets for the machine learning according to claim 5, wherein the correcting the first label areas includes contracting the first label areas of the training label image when it is determined by the comparison between the non-detection evaluation value and the false-detection evaluation value that there are more undetected labels than falsely detected labels in the determination label image.

8. The method for generating the training data sets for the machine learning according to claim 5, further comprising:
excluding the training data including the training label image determined to have at least one of more than a predetermined threshold number of undetected labels or more than a predetermined threshold number of falsely detected labels from training data set.

9. The method for generating the training data sets for the machine learning according to claim 1, further comprising:
setting priorities between first labels of the training label image;
wherein the correcting the first label areas includes adjusting amounts of correction of the first label areas according to the priorities.

10. The method for generating the training data sets for the machine learning according to claim 9, wherein the correcting the first label areas includes correcting the first label areas of the training label image while expansion of the first label areas having a lower priority to the first label areas having a higher priority is prohibited.

11. The method for generating the training data sets for the machine learning according to claim 1, wherein the correcting the first label areas includes dividing the training label image into a plurality of partial images, and correcting the first label areas for at least one partial image of the divided training label image.

12. The method for generating the training data sets for the machine learning according to claim 1, wherein the comparing the first label areas of the training label image and the second label areas of the determination label image includes comparing the first and second labels of the corresponding portions of the determination label image and the training label image with each other for every image pixel or every plurality of adjacent image pixels.

13. The method for generating the training data sets for the machine learning according to claim 1, further comprising:
creating the determination label image by the trained model using the training data including the corrected training label image;
wherein the correcting the first label areas includes correcting the first label areas included in the corrected training label image again based on comparison results between the created determination label image and the corrected training label image.

14. A trained model creation method by machine learning for performing a segmentation process on an image, the trained model creation method comprising:
preparing a pre-trained model for performing segmentation process, the pre-trained model trained based on training data sets, each of the training data sets including an input image and a training label image, the training label image including a plurality of divided first label areas;
performing the segmentation process on the input image for one of the training data sets by the prepared pre-trained model to output a determination label image including a plurality of divided second label areas;
comparing first and second labels of corresponding portions in the created determination label image and the training label image with each other;
correcting the first label areas, based on the step of comparing the first and second label areas; and
creating a trained model by performing the machine learning using the training data including the corrected training label image.

15. An image analysis device comprising:
an image input configured to receive an input of an analysis image;
an analysis processor configured to perform a segmentation process on the analysis image using a trained model by machine learning to create a label image divided into a plurality of label areas;
a storage configured to store the trained model;
a determination image creating unit configured to perform the segmentation process on an input image for one of training data sets including the input image and a training label image including a plurality of divided first label areas with the trained model stored in the storage as a pre-trained model to create a determination label image including a plurality of divided second label areas;
a comparator configured to compare the first and second labels of corresponding portions in the determination label image created by the determination image creating unit and the training label image with each other; and
a label corrector configured to correct the first label areas based ion the comparing the first and second label areas by the comparator.

* * * * *